United States Patent
Suh

(10) Patent No.: US 10,284,550 B2
(45) Date of Patent: May 7, 2019

(54) METHOD FOR SUPPORTING SUBSCRIBER'S SERVICE PROVIDER CHANGE RESTRICTION POLICY IN MOBILE COMMUNICATIONS AND APPARATUS THEREFOR

(71) Applicant: Samsung Electronics Co., Ltd, Gyeonggi-do (KR)

(72) Inventor: Kyungjoo Suh, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 253 days.

(21) Appl. No.: 14/784,906

(22) PCT Filed: Apr. 15, 2014

(86) PCT No.: PCT/KR2014/003255
§ 371 (c)(1),
(2) Date: Oct. 15, 2015

(87) PCT Pub. No.: WO2014/171711
PCT Pub. Date: Oct. 23, 2014

(65) Prior Publication Data
US 2016/0149903 A1    May 26, 2016

(30) Foreign Application Priority Data

Apr. 15, 2013 (KR) .................. 10-2013-0041233
May 31, 2013 (KR) .................. 10-2013-0062899

(51) Int. Cl.
*H04L 29/06* (2006.01)
*H04W 12/06* (2009.01)

(52) U.S. Cl.
CPC ...... *H04L 63/0853* (2013.01); *H04L 63/0428* (2013.01); *H04L 63/0823* (2013.01); *H04W 12/06* (2013.01)

(58) Field of Classification Search
CPC .................................................. H04L 63/0893
(Continued)

(56) References Cited

U.S. PATENT DOCUMENTS 9,628,981 B2 * 4/2017 Park ................. H04W 12/06
9,674,690 B2 * 6/2017 Lee .................. H04W 8/183
(Continued)

FOREIGN PATENT DOCUMENTS

EP          2448301 A1      5/2012
WO     WO 2012/030067 A2    3/2012
(Continued)

OTHER PUBLICATIONS

International Search Report dated Jul. 8, 2014 in connection with International Patent Application No. PCT/KR2014/003255, 6 pages.
(Continued)

*Primary Examiner* — Dant B Shaifer Harriman

(57) ABSTRACT

The present invention relates to a method and an apparatus for employing an embedded subscriber identity module (hereinafter referred to as eSIM) to apply a policy such as a subsidy policy to, activate, deactivate, add to, update, and delete a user profile in a mobile communications network. The present invention enables a mobile device to determine whether to host the policy of a new service provider when it changes the present service provider or to perform a lock for prohibiting the policy change, and to change the profile related to the determination. The present invention also enables a mobile device to replace the policy related to the service provider by applying the policy, or to employ eSIM so as to activate, deactivate, revise, add, or delete the rules of the policy related to the service provider. The present invention provides various examples of hosting and applying the policy and various examples of activating, deacti-
(Continued)

vating, revising, adding, deleting the policy rules so as to make eSIM identify the subscriber as the existing subscriber identity module. The invention also enables the device or eSIM to be reused when changing the service provider throughout the life cycle thereof without limiting the use of eSIM to a single service provider. The invention also provides a method for locking the policy applied per service provider, and the use of eSIM when changing to another service provider by the policy per service provider. The present invention also provides a method for checking the criteria of decision and verifying the power of decision when administering the policy rules and eSIM through deleting, adding, revising, activating, and deactivating the profile management plan and policy rules by applying the service provider's policy. Thus the present invention enables the device to host a new service provider's policy for communicating therewith when changing from the existing service provider to the new service provider, or when the government changes the service provider for an M2M device related to the electricity, infrastructure, etc. under an environment such as EUTRAN (Evolved Universal Terrestrial Radio Access Network) or UTRAN (Universal Terrestrial Radio Access Network)/GERAN (GSM/EDGE Radio Access Network). The present invention also is advantageous in that if the change of a service provider is not allowed according the policy of the existing service provider, the information related to communication and the security information are set revised safely by locking, thus enhancing the communication efficiency and security. The present invention also enables the device to verify the power of the user or to revise safely the information of eSIM for adding, revising, deleting, activating, and deactivating the policy rules for managing the operation profile for administration of the policy of the service provider under an environment such as EUTRAN (Evolved Universal Terrestrial Radio Access Network) or UTRAN (Universal Terrestrial Radio Access Network)/GERAN (GSM/EDGE Radio Access Network), thus enhancing the communication efficiency and security.

20 Claims, 17 Drawing Sheets

(58) Field of Classification Search
USPC .......................................................... 713/156
See application file for complete search history.

(56) References Cited

U.S. PATENT DOCUMENTS

| | | | |
|---|---|---|---|
| 2009/0089865 A1* | 4/2009 | Baron | G06F 21/6209 726/6 |
| 2014/0287725 A1* | 9/2014 | Lee | H04W 12/06 455/411 |
| 2014/0329502 A1* | 11/2014 | Lee | H04W 12/06 455/411 |
| 2015/0110035 A1* | 4/2015 | Lee | H04W 8/183 370/329 |
| 2016/0057624 A1* | 2/2016 | Yang | H04W 12/06 455/411 |
| 2016/0057725 A1* | 2/2016 | Suh | G06Q 50/30 455/435.1 |
| 2016/0149903 A1* | 5/2016 | Suh | H04L 63/0428 713/156 |
| 2017/0222991 A1* | 8/2017 | Yang | H04L 9/006 |
| 2018/0027480 A1* | 1/2018 | Narasimhan | H04W 8/02 455/435.1 |
| 2018/0176768 A1* | 6/2018 | Baek | H04W 8/205 |
| 2018/0302781 A1* | 10/2018 | Lee | H04W 8/20 |

FOREIGN PATENT DOCUMENTS

| | | |
|---|---|---|
| WO | WO 2012/076425 A1 | 6/2012 |
| WO | WO 2013/009059 A2 | 1/2013 |
| WO | WO 2013/036010 A1 | 3/2013 |

OTHER PUBLICATIONS

Written Opinion of the International Searching Authority dated Jul. 8, 2014 in connection with International Patent Application No. PCT/KR2014/003255, 8 pages.

* cited by examiner

METHOD FOR SUPPORTING SUBSCRIBER'S SERVICE PROVIDER CHANGE RESTRICTION POLICY IN MOBILE COMMUNICATIONS AND APPARATUS THEREFOR

CROSS-REFERENCE TO RELATED APPLICATION(S)

The present application claims priority under 35 U.S.C. § 365 to International Patent Application No. PCT/KR2014/003255 filed Apr. 15, 2014, entitled "METHOD FOR SUPPORTING SUBSCRIBER'S SERVICE PROVIDER CHANGE RESTRICTION POLICY IN MOBILE COMMUNICATIONS AND APPARATUS THEREFOR", and, through International Patent Application No. PCT/KR2014/003255, to Korean Patent Application No. 10-2013-0041233 filed Apr. 15, 2013 and Korean Patent Application No. 10-2013-0062899 filed May 31, 2013, each of which are incorporated herein by reference into the present disclosure as if fully set forth herein.

TECHNICAL FIELD

The present invention relates an apparatus responsible for communication function of a device such as a legacy mobile communication terminal, a machine type communication terminal, Consumer Devices, and vending machine.

The present invention relates to a Subscriber Identity Module (SIM) for use in communication using such devices and, in particular, to an embedded SIM (eSIM) capable of changing the operator or initializing the information stored therein unlike the legacy SIM.

The present invention is capable of configuring a change lock in setting the policy and changing the policy or operator for operator configuration and security configuration in the eSIM. Particularly, the present invention relates to a method and apparatus for allowing a device to communicate using the eSIM and facilitating operator selection and change securely.

BACKGROUND ART

In the conventional operator-centered communication system architecture, there was lack of discussion on the system and method for managing subscriber information, security configuration, and policy, due to the security vulnerability of the operator information and terminal information and other management difficulties.

As a consequence, the conventional communication system is likely to be vulnerable in security and inefficient in communication.

DISCLOSURE OF INVENTION

Technical Problem

The present invention relates to an apparatus responsible for communication function of a device such as a legacy mobile communication terminal, a machine type communication terminal, Consumer Devices, and vending machine.

The present invention relates to a Subscriber Identity Module (SIM) for use in communication using such devices and, in particular, to an embedded SIM (eSIM) capable of changing the operator or initializing the information stored therein unlike the legacy SIM.

The present invention is capable of configuring a change lock in setting the policy and changing the policy or operator for operator configuration and security configuration in the eSIM. Also, the present invention provides a policy management method capable of applying a policy allowing for configuring subscriber information and security of the eSIM and changing eSIM information so as to add, update, delete, activate, and deactivate policy. Also, the present invention relates to a method and apparatus for allowing a device to communicate using the eSIM and facilitating operator selection and change securely and managing the policy efficiently.

The present invention relates to a SIM, particularly eSIM, for enabling a device to perform a communication function through an evolved mobile communication system such as 3GPP EPS. The present invention provides a policy application method and apparatus which is capable of applying a policy to the eSIM in such a way of managing the policy in switching to a new operator, determining whether it is possible to switch to the new network operator based on the old operator, and locking the change when switching to the new operator is impossible.

Also, the present invention relates to a SIM, particularly eSIM, enabling a device to perform a communication function through an evolved mobile communication system such as 3GPP EPS and a method of managing a profile of the eSIM with a policy. Also, the present invention relates to a method for adding, deleting, updating, activating, and deactivating a policy which is used to determine the operation of the eSIM.

The device performing communication according to the present invention is capable of changing the subscriber profile by applying a predetermined policy. Also, the device performing communication according to the present invention is capable of activating, deactivating, updating, adding, and deleting the policy of the operation using the eSIM.

The present invention is advantageous in terms of facilitating subscription to a new operator with the eSIM for a device in the network environment such as Evolved Universal Terrestrial Radio Access Network (E-UTRAN) and Universal Terrestrial Radio Access Network/GSM/EDGE Radio Access Network (UTRAN/GERAN) in such a way of receiving a policy of a new operator, determining whether it is possible to change the operator based on the policy of the old operator, and configuring a change lock if the change of operator is impossible, so as to make it possible to change the operator or other things securely and efficiently and facilitate communication.

Also, the present invention is capable of allowing the device to check the right of activating and deleting the subscriber profile based on the operator's policy provided by means of the eSIM. Also, the device is capable of adding, updating, deleting, activating, and deactivating a policy rule for use in managing the operational profile so as to configure the communication-related information and security information stored in the eSIM. As a consequence, it is possible to improve the communication efficiency and security.

Solution to Problem

In accordance with an aspect of the present invention, a policy application method of a server for applying an operator policy to a terminal having an eSIM includes receiving a request for use of a second operator network from a terminal which performs data communication through a first operator network, verifying a profile received from the second operator, and transmitting the profile to the terminal of the second operator network depending on the verification result.

In accordance with another aspect of the present invention, an operator policy application method of a terminal having an eSIM includes transmitting a request for use of a second operator network in the state of communicating through a first operator network, installing a profile of the second operator network received from the server on the eSIM, and performing data communication through the second operator network using the profile of the second operator network which is installed on the eSIM.

In accordance with another aspect of the present invention, a server for applying an operator policy to a terminal having an eSIM includes a communication unit which performs data communication with the terminal and operators and a control unit which verifies, when a request for use of a second operator network is received from the terminal which performs data communication through a first operator network, a profile received from the second operator and controls the communication unit to transmit the profile to the terminal of the second operator network depending on the verification result.

In accordance with still another aspect of the present invention, a terminal for controlling operator policy application includes an eSIM for applying and managing a profile of an operator network, a communication unit for data communication with a server or an operator network, and a communication unit which controls the communication unit to transmit a request for use of a second operator network in the state of communicating through a first operator network, installs a profile of the second operator network received from the server on the eSIM, and controls the communication unit to perform data communication through the second operator network using the profile of the second operator network which is installed on the eSIM.

Advantageous Effects of Invention

The advantageous effects of the representative aspects of the present invention operating as described above are summarized as follows.

The present invention is advantageous in terms of facilitating subscription to a new operator with the eSIM for a device in the network environment such as Evolved Universal Terrestrial Radio Access Network (E-UTRAN) and Universal Terrestrial Radio Access Network/GSM/EDGE Radio Access Network (UTRAN/GERAN) in such a way of receiving a policy of a new operator, determining whether it is possible to change the operator based on the policy of the old operator, and configuring a change lock if the change of operator is impossible, so as to make it possible to change the operator or other things securely and efficiently and facilitate communication.

Also, the present invention is capable of allowing the device to manage the profile by checking the right of activating and deleting the subscriber profile based on the operator's policy provided by means of the eSIM and adding, updating, deleting, activating, and deactivating a policy rule for use in managing the operational profile so as to configure the communication-related information and security information stored in the eSIM, thereby improving the communication efficiency and security.

MODE FOR THE INVENTION

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

In the following description, the subject matter of the present invention is to receive the operator's policy or common policy and apply the received policy to the eSIM in the communication procedure of a User Equipment (UE) representing the aforementioned various types of devices. In the following description, the subject matter of the present invention is to provide a method for restricting change of operator and guaranteeing secure communication through a procedure of receiving an operator change restriction policy and applying the policy to the eSIM when the change restriction is required, e.g. when the operator change restriction is required due to a subsidy policy. Also, the subject matter of the present invention is to provide a method of adding, updating, deleting, activating, and deactivating a policy providing determination criteria for managing the eSIM so as to make it possible for the device to perform communication stably based on the policy.

Although the description is directed to the 3GPP EPS system, UTRAN, and GERAN, the present invention is applicable to other types of mobile communication systems. That is, it will be understood by those skilled in the art that the present invention can be applied even to other communication systems having the similar technical background and channel format, with a slight modification, without departing from the spirit and scope of the present invention. Meanwhile, various modifications and changes can be made thereto without departing from the scope of the invention.

Figure 1:
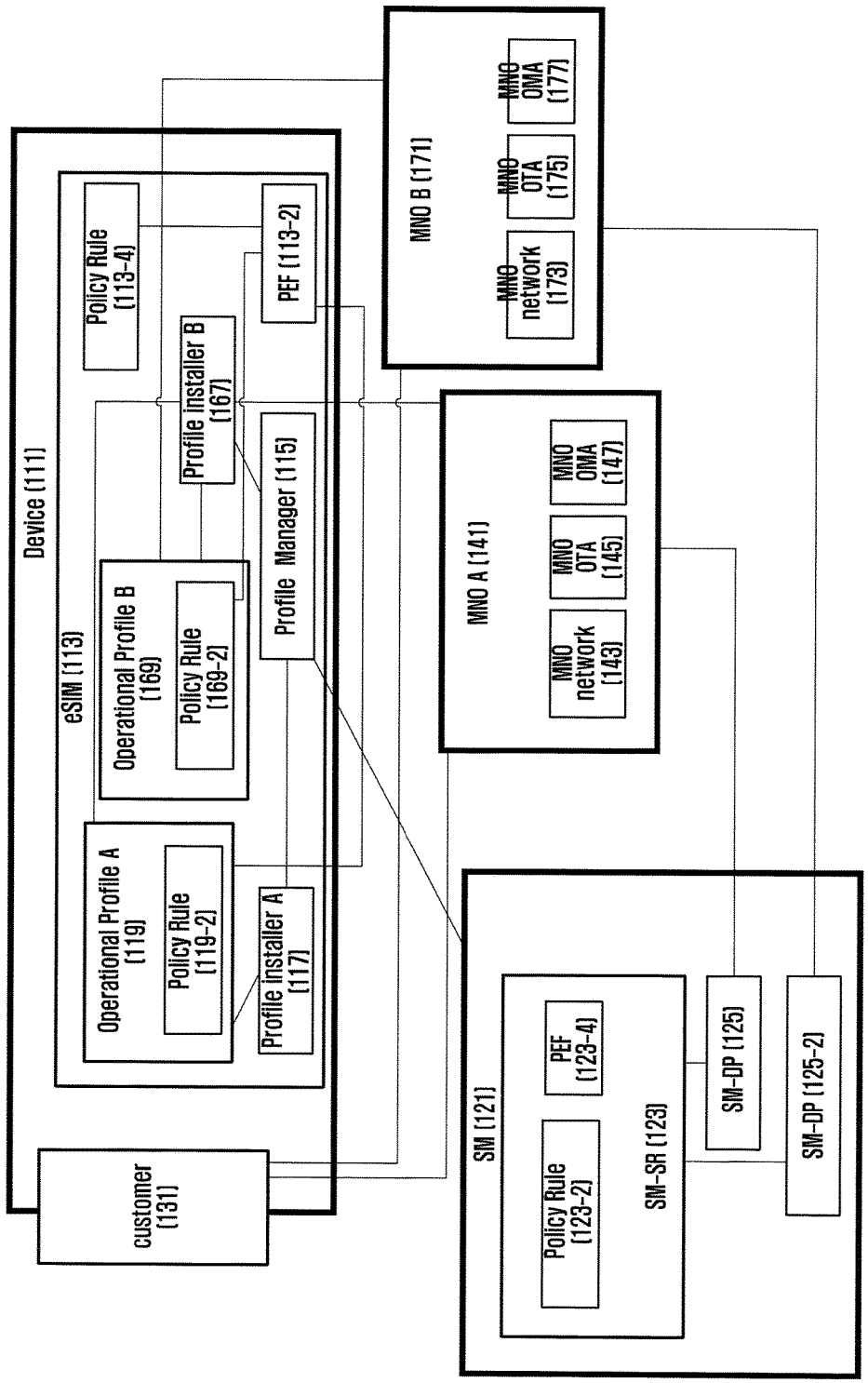
FIG. 1 is a diagram illustrating architecture of a mobile communication system according to an embodiment of the present invention.

FIG. 1 is a diagram illustrating architecture of a mobile communication system according to an embodiment of the present invention.

Referring to FIG. 1, the mobile communication system according to an embodiment of the present invention is capable of applying the operator's policy for secure communication of the device with a SIM, particularly eSIM, and restricting/allowing change of the operator according to the policy. According to an embodiment of the present invention, the mobile communication system is capable of allowing for applying the operator's policy and activating, deactivating, modifying, adding, deleting, and updating the policy information including the subscription information of the operator. FIG. 1 shows the architecture of the 3GPP EPS system as an example of the mobile communication system according to an embodiment of the present invention. Although the description is directed to E-UTRAN in the following, the present invention can be applied to other similar mobile communication systems.

Referring to FIG. 1, the device 111 may be one of various types of devices such as legacy User Equipment (UE), machine type communication device, Consumer Device, and vending machine.

The device 111 may be capable of performing a communication function with an embedded SIM (eSIM) 113.

The eSIM 113 includes a profile manager 115, profile installers 117 and 167, profiles 119 and 169, eSIM policy rules 119-2, 169-2, and 113-4, and eSIM Policy Enforcement Function (PEF) 113-2.

The profile manager 115 is responsible for profile routing and management functions of the eSIM.

The profile installers 117 and 167 are responsible for installing the profile in the eSIM.

The profiles 119 and 169 include an identifier and security key necessary for performing communication function with the operator. The identifier may include at least one of IMSI and MSISDN, and the security key may be stored in the authentication center (AUC) and Subscriber Identity Module (SIM) for communication with the operator and may include a security key K corresponding to the master key. In order to configure the profile necessary in the eSIM, the customer 131 requests for subscription to the operator, the subscription request being made through a subscription request portal site or the device 111.

The eSIM policy rules 119-2, 169-2, and 113-4 may be included in the profiles 119 and 169 or inside the eSIM 113. The eSIM policy rules 119-2, 169-2, and 113-4 may be applied distinctly depending on the position where they are placed, detailed description on the policy rules being made with reference to FIG. 2.

The eSIM Policy Enforcement Function (PEF) 113-2 may be included in the eSIM 113 and responsible for executing the eSIM policy rules 119-2, 169-2, and 113-4 placed in the profiles 119 and 169.

The Subscription Manager (SM) 121 transmits and manages the data related to the eSIM 113 which are necessary for the device 111 to subscribe to the operator network.

The subscription manager 121 includes a Subscription Manager-Secure Routing (SM-SR) 123, Subscription Manager-Data Preparation (SM-DP) 125 and 125-2, an SM policy rule 123-2, and SM Policy Enforcement Function (PEF) 123-4.

The SM-SR 123 and SM-DPs 125 and 125-2 may be implemented as a single entity called SM or an entity separated functionally depending on the operation scenario.

The SM-SR 123 may be shared by several operators and operate in association with the several operations, but the SM-DPs 125 and 125-2 cipher the operator-related data so as to be managed per operator.

Although the present invention is directed to the embodiment of a representative case where the SM policy rule 123-2 and SM Policy Enforcement Function (PEF) 123-4 are included in the SM-SR 123, other configurations may be applicable.

The device 111 may configure the data and security key values necessary for connection to the Mobile Network Operators (MNOs) 141 and 171 and connects to the MNOs 141 and 171 through subscription management of the SM 121.

The MNOs 141 and 171 may include the MNO networks 143 and 173 responsible for registration and deregistration and location management of the device, MNO OTAs 145 and 175 responsible for operator information management Over The Air (OTA), and MNO OMAs 147 and 177 responsible for Open Mobile Alliance Device Management (OMA DM).

In the present invention, if the device 111 having an ongoing communication session with an operator based on the cellular and Internet communication protocols attempts communication with another operator, the device 111, SM 121, and MNOs 141 and 171 may receive a policy for communication through other operator networks, configure change lock according to the policy, and use the related data and security information safely.

In the present invention, the device 111, SM 121, and MNOs 141 and 171 are capable of supporting the operations of activating/deactivating the subscriber information based on the policy and changing, adding, deleting, updating, activating, and deactivating the policy for communication.

Figure 2:
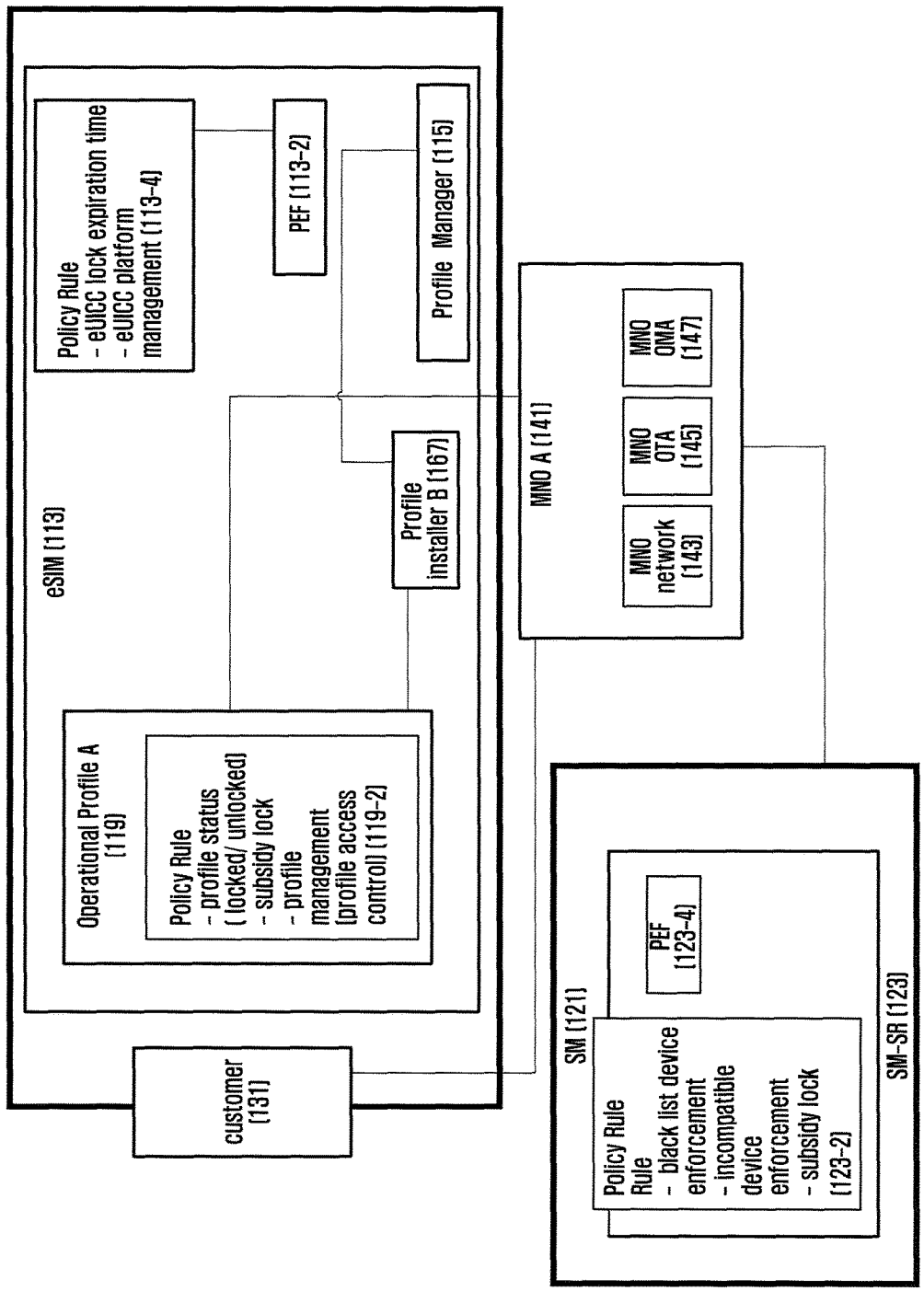
FIG. 2 is a diagram illustrating the policy content of the mobile communication system according to an embodiment of the present invention.

FIG. 2 is a diagram illustrating the policy content of the mobile communication system according to an embodiment of the present invention.

FIG. 2 shows a policy-related environment for explaining how the eSIM 113 or SM 121 applies policy rules selectively and enforces the policy according to an embodiment of the present invention.

The policy rule 119-2 existing in the operational profile 119 of the eSIM 113 includes a policy related to profile status, a lock policy related to the subsidy policy, and a policy related to profile management.

The profile status-related policy may include the policy related to the operation of locking/unlocking the profile.

The subsidy policy-related lock policy may include the subsidy lock policy for locking the change of operator of the terminal with subsidy to another operator during the subsidy support period (e.g., 2 years).

The profile management-related policy may include a policy related to profile access control.

The policy rule 113-4 existing separately in the eSIM 113 may include an eUICC or eSIM lock configuration policy for managing the eUICC lock expiration time and a policy related to the management of the eUICC or eSIM platform.

The eSIM 113 may be provided with an eSIM PEF 113-2 for executing the policy in the eUICC, eSIM 113, or profile 119.

Meanwhile, the SM 121 also includes the SM policy rule 123-2. The SM policy rule 123-2 may include a policy related to execution of the policy for handing the black list devices of which communication is blocked in the operator network, i.e. the policy related to the stolen or missing phone handling policy execution, a policy related to the execution of the policy of handling the devices incompatible with the operator network environment, and a policy for executing the subsidy policy. The SM 121 also may include the SM PE 123-4 for executing the policy rule of the SM 121.

Depending on which entity has the policy rule or Policy Enforcement Function, the profile, eSIM, and SM-related operator's eSIM management range and operation may vary. In the case that the policy rule is located at several entities, the operation scenario of the profile, eSIM, and SM may vary depending on their priorities.

In an embodiment, if the subsidy lock-related policy exists in the SM-SR and profile (case 1), the SM-SR may have the common subsidy-related policy for all operators sharing the SM-SR (case 1-1) or a policy for all operators (case 1-2). In another embodiment, if the subsidy-related policy exists in the profile (case 2), the SM-SR may store a policy of a specific operator related to the profile.

In the case that the subsidy-related policy exists in the SM-SR, since the operator communicates with the SM-SR which manages the profile with the operator-related policy, the operator can control the lock release in the profile.

In the case that the policy exists in the profile but does not exist in the SM-SR, and the Policy Enforcement Function (PEF) for releasing the lock and managing the policy exists in the SM-SR, the SM-SR can read the policy from the profile or eSIM to enforce the policy. However, this scenario may be inefficient. This is because it degrades the efficiency for the PEF existing in the SM-SR to read and enforce the policy existing in the profile.

Meanwhile, in the case where the subsidy-related policy exists in the profile and the subsidy lock is configured in the operation of allowing for change of operator with a policy, the lock in the profile may be unlocked by the operator in an embodiment (case 2-1) but, in another embodiment (case 2-2) where the lock exists in the profile and the policy related to the profile exists, it may be possible for the user to unlock the lock.

In the case that the policy rules exist in several entities, i.e. the policy rules exist in the profile, eSIM, and SM (particularly SM-SR), the operation may vary depending on how to apply the priorities as follows. Suppose that the policy rule exists in the profile, eSIM, and SM-SR; and the policies target the same function. For example, if the priority of the policy existing in the eSIM is higher than that of the policy existing in the SM-SR (case 1) and if the two policies conflict with each other, the eSIM is executed with priority. Accordingly, when a lock expiration timer of the subsidy policy is configured in the eSIM, the lock may be unlocked according to the expiry of the subsidy lock. In this case, since the eSIM can make a lock release determination without assistance of the SM-SR, it can be executed with higher priority than that of the SM-SR. This is efficient because of low message overhead to the network, and the UE's or the eSIM's dependency on the operator is reduced because the eSIM is granted more rights.

Meanwhile, in the case that the priority of the SM-SR is higher than that of the eSIM (case 2), the SM-SR reads the policy rule to determine whether to release the lock configuration. In this case, the SM-SR reads the policy rule to release the lock configuration and enforce the policy with priority regardless that the policy is read from the eSIM or SM-SR. Depending on whether the SM-SR reads the policy from the eSIM or SM-SR, the messaging overhead to the network varies; however, since the SM-SR determines whether to release the lock configuration to the policy rules basically, it may cause transmission overhead in the network.

Figure 3A:
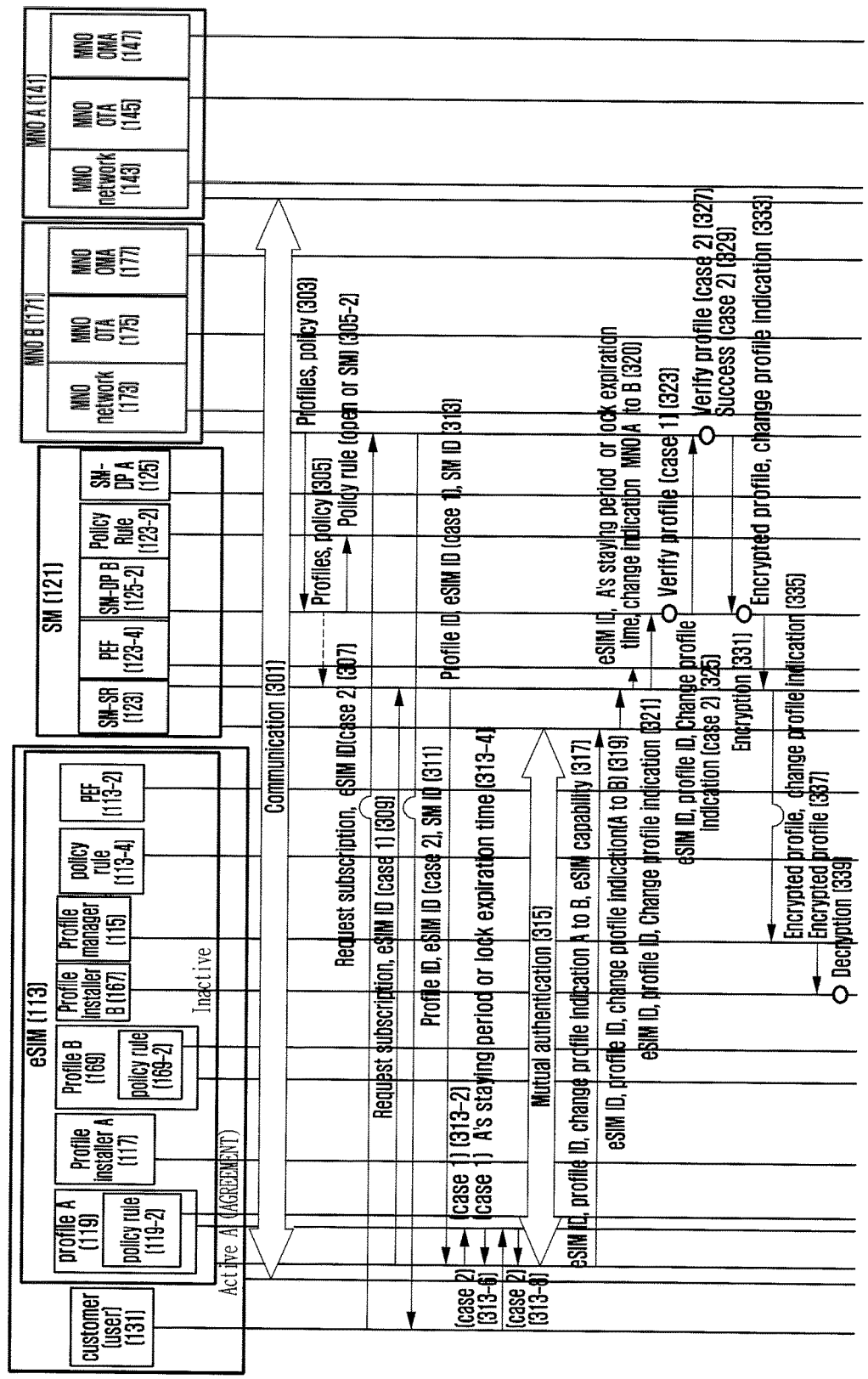
FIGS. 3A and 3B are signal flow diagrams illustrating the policy application method for supporting operator change lock policy according to the first embodiment of the present invention.
Figure 3B:
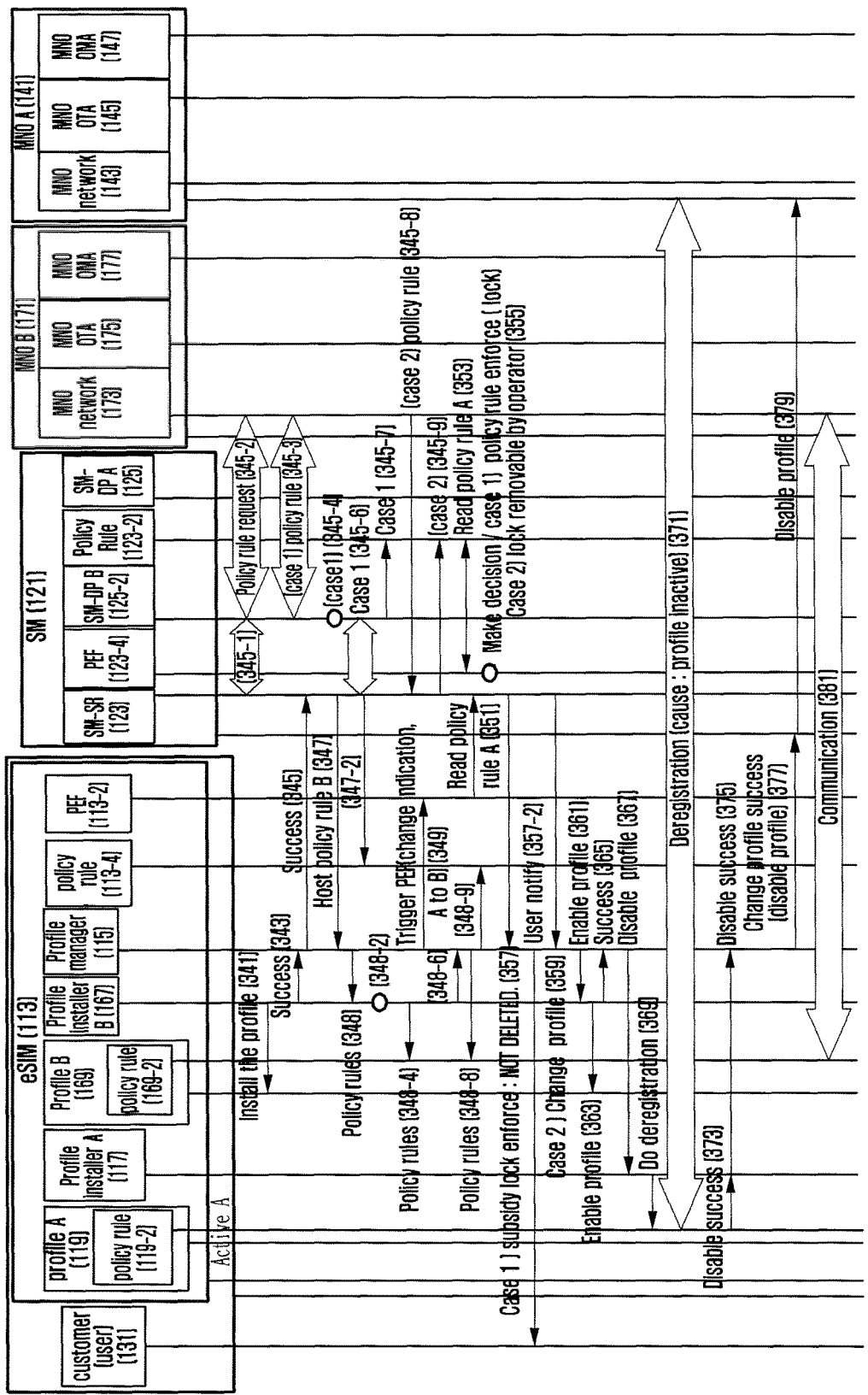

FIGS. 3A and 3B are signal flow diagrams illustrating the policy application method for supporting operator change lock policy according to the first embodiment of the present invention.

In detail, FIGS. 3A and 3B are signal flow diagrams illustrating the communication and security procedure for applying a policy in changing the operator according to an embodiment of the present invention. FIG. 3 shows the case where the SM performs the policy application and determination, i.e. lock configuration and determination.

FIG. 3 is directed to an embodiment in which the profile A is in an active state and the eSIM has 2-year agreement with the operator A. Meanwhile, the profile B is in an inactive state, and the user wants to switch from the operator A to the operator B.

A description is made with reference to FIG. 3A hereinafter.

The device (or terminal) communicates with the MNO (operator) A using the profile information stored in the eSIM at step 301.

The profile includes a network identifier and security key K for use in communication with the operator. The identifier may include at least one of IMSI and MSISDN, and the security key may include the value of security key K corresponding to the master key stored in the Authentication Center (AUC) and Subscriber Identity Module (SIM) for use in communication with operation.

The profile is comprised of an operational profile and a provisioning profile.

The operational profile includes remote files and application management information. The operational profile also includes a credential for connection to an operator network. In order to manage the contents of the profiles, the eSIM may be provided with a profile content manager which has the OTA security key of the MNO and MSISDN.

The provisioning profile provides transport capability for profile management and eSIM management between the eSIM and SM-SR.

The profile may include a profile identifier (ID), aforementioned security key, pins for OTA service identification, certificates for use in authenticating itself with the counterpart peer, parameters related to the algorithm pertaining to security or communication, application programs, operator's algorithm capability, i.e. information on the algorithms supported by the operator, and profile information indicating whether the profile is the operational profile or provisioning profile.

The MNO B (operator) may transmit the profiles to the SM at step 303. In this case, a secure connection should be established between the SM and MNO B. According to another embodiment of the present invention, the MNO (operator) may transmits the profiles to the SM-DP or SM-SR depending on the profile management type of the SM at step 305.

The MNO B may transmit the policy rule related to the corresponding profile along with the profile at step 305-2. In this case, the SM policy rule managed by the SM or policy information announced to even other operators publicly, e.g. subsidy policy (subsidy lock) information, may be managed (hosted).

The customer may send the MNO B a subscription request including the eSIM ID at step 309 or 307. The subscription request may be made through a portal site of the MNO at step 309 (case 1) or through the MNO network, wireless LAN, and Internet using the network or Internet access function of the device at step 307 (case 2).

The MNO B sends the device a profile ID, eSIM ID, SM ID, or SM address in response to the customer's subscription request at step 311 or 313. If the subscription request is made at step 309 (case 1), the MNO B sends the device the corresponding information in response to the subscription request at step 313; and if the subscription request is made at step 307 (case 2), the MNO B sends the portal site the corresponding information in response to the subscription request at step 311.

The eSIM or customer acquires a subscription continuation period for the MNO A from the profile A at steps 313-2 to 313-4 (case 1) or 313-6 to 313-8 (case 2). The eSIM makes a request to the policy rule for the subscription continuation period of the profile A and receives a response to acquire the continuation period at step 313-2 or 313-6. The user may calculate the expiration time of the lock of the profile A to read out from the policy rule at step 313-4 or 313-8.

The eSIM and SM perform an authentication procedure at step 315. The authentication may be done through an authentication method with a security key of the eSIM and a public key of the SM or an authentication organization-assisted authentication method with the certifications of the eSIM and SM.

According to an embodiment of the present invention, the eSIM sends the SM the eSIM identifier (ID), profile Identifier (ID), profile change indicator, eSIM capability, and continuation period of profile A or lock expiration time of profile A at step 317. Here, the eSIM capability denotes the capability necessary for generating the profile, i.e. security credential and security information.

The SM sends the SM-SR the eSIM ID, profile ID, profile change indicator, and continuation period of profile A or lock expiration time of profile A at step 319. According to an embodiment of the present invention, steps 317 and 319 may be performed as a single process depending on how the profile-related data is managed in the SM.

The SM-SR sends the SM PEF the continuation period or lock expiration time of profile A at step 320.

In the subsequent procedure, the SM may have the SM-SR and SM-DP as separate entities as described with reference to FIG. 1 and may include the SM-SR 123, Policy Enforcement Function (PEF) 1230-4, and SM policy rule 123-2. Meanwhile, the SM-DPs 125 and 125-2 may be established per operator in order for the operator networks to manage their subscribers.

The SM-SR sends the SM-DP the eSIM ID, profile ID, and profile change indicator at step 321.

According to an embodiment of the present invention, the SM-DP verifies whether the profile ID matches any profile ID of the corresponding MNO at step 323 (case 1).

According to another embodiment of the present invention, the SM-DP (case 2-1), SM-SR (case 2-2), or SM (case 2-3) sends the MNO the profile ID and eSIM ID to verify whether the corresponding profile ID is assigned to the eSIM at step 325. At this step, whether the profile ID and eSIM ID are transmitted by the SM-DP, SM-SR, or SM depends on how profile-related data are managed in the SM.

The MNO may verify that the corresponding profile ID is assigned to the corresponding eSIM at step 327 (case 2).

If the verification is successful at step 329, the MNO sends the SM-DP a response message to inform of the successful verification at step 323.

Afterward, the successfully verified profile ID is encrypted to generate the corresponding profile to the corresponding eSIM at step 331. Next, the SM-DP sends the SM-SR the encrypted profile at step 333, and the SM-SR sends the encrypted profile to the profile manager of the eSIM at step 335.

The encrypted profile is transmitted from the profile manager to the profile installer at step 339, and the profile installer decrypts the corresponding profile at step 339.

The profile installer operates according to various embodiments of the present invention.

First, in the case that the profile installer is established per profile or profile group as denoted by reference numbers 117 and 167 in the drawing, each profile installer has to have the profile installer credential corresponding to the SM-DP and this makes it necessary for a reliable certificate authority to update the profile installer credential.

Second, in the case that the profile installer is established per profile or per profile group as denoted by reference numbers 117 and 167, a pre-configured profile installer credential exists and thus the profile installers of the SM-DP and eSIM can check the profile installer credential to use based on the index.

Third, one profile installer exists in the eSIM, i.e. the profile installers 117 and 167 are identical with each other, and there is one profile installer credential such that the SM-DP communicates with it.

A description is made with reference to FIG. 3B. The profile installer installs the decrypted profile at step 341. The profile installer notifies the profile manager of successful installation of the profile at step 343. The profile manager notifies the SM-SR of the successful installation of the profile at step 345.

The SM-SR sends the profile manager the policy rule B such that the profile manager manages (hosts) the policy rule B in the profile B at step 347.

According to an embodiment, the policy rule B may be the one transmitted by the MNO B along with the profile at steps 303 and 305 (case 1).

According to another embodiment, the policy rule B may be the one requested to the MNO via the SM-DP through steps 345-1, 345-2, 345-3, 345-4, 345-6, and 345-7 after the SM recognizes the successful installation of the profile at step 345 (case 2). That is, the policy rule B may be the policy rule acquired in such a way that the MNO sends the SM-DP a policy rule at step 345-3 and the MS-DP encrypts the policy rule at step 345-4 and transmits the encrypted policy rule to the SM-SR at step 345-6. At this time, the policy rule that may be managed by the SM-SR or SM or publicized to other operators among the policy rules related to the MNO B such as subsidy policy (e.g. subscription change lock of 2 years) may be managed according to the SM policy rule as denoted by reference number of 345-7.

According to another embodiment, the policy rule B may be the plain policy rule received from the SM-SR MNO as denoted by reference number 345-8 in response to the policy rule request made to the MNO via the SM-DP through steps 345-1 and 345-2 after it recognizes that the profile has been installed successfully (case 2). In the case of the policy which may be publicized to or shared by the SM or other operators, the SM-SR may host the policy rule at step 345-9.

The policy rule may be hosted according to various embodiments.

An embodiment is directed to a procedure of hosting the policy rule B to the profile B as denoted by reference numbers 348, 348-2, 348-4, and 348-6, and this procedure includes transmitting, when the policy rule B is transmitted in the encrypted state, the policy rule from the profile manager to the profile installer at step 348, decrypting the encrypted policy rule at step 348-2, transporting it into the profile at step 348-4, and reporting it from the profile installer to the profile manager at step 348-6.

In another embodiment, the policy rule is hosted into the profile by the profile manager without being encrypted as denoted by reference number 348-8.

In another embodiment, the profile manager may host the policy rule to be managed by the eSIM into the eSIM as denoted by reference number 348-9.

The profile manager triggers an operation in order for the PEF to read the policy rule A afterward at step 349. That is, the profile manager sends the PEF the profile change indication along with the information on the attempt of switching the profile from A to B. Afterward, the eSIM PEF commands the SM-SR to read the policy rule of the profile A at step 351. The SM-SR reads the policy rule A of the profile A at step 353, and the PEF of the SM determines whether to enforce the policy rule to lock or whether the lock is removable by the operator at step 355.

If the lock is configured, e.g. if the 2-year agreement of subscription for the MNO A is not expired and thus change from operator A to operator B is impossible, the SM notifies the profile manager or eSIM of the lock enforcement situation, i.e. the situation in which the profile A cannot be changed for use in other operators, at step 357. The profile manager or eSIM notifies the user of the change lock situation at step 357-2.

In another embodiment, if the lock is not enforced, i.e. if the period agreed with the operator A (e.g. 2-year agreement period) has expired and thus it is possible to change the operator, the SM-SR notifies the profile manager of the profile change at step 359.

The profile manager instructs the profile installer to activate (enable) the profile of the operator (MNO B) to which the user wants to subscribe newly at step 361. The profile installer activates the profile at step 363.

In the case that the profile of the operator to which the user wants to subscribe newly is activated successfully, the profile installer notifies the profile manager of the successful activation. According to another embodiment of the present invention, step 365 may be omitted.

The profile manager instructs the profile installer/old profile installer (when plural profile installers exist) to disable (inactivate) the profile of the old operator at step 367.

The profile installer instructs the old profile to deregister with the old operator at step 369. The profile performs deregistration with the old operator and sets the cause value to 'profile inactive' at step 371. The cause value of 'profile inactive' may be set for the reason of the change of operator.

If the deregistration procedure is performed successfully, the old profile notifies the old profile installer of the deactivation of the profile of the old operator at step 373. According to another embodiment of the present invention, step 373 may be omitted. The profile installer notifies the profile manager of the successful deactivation of the old profile.

The profile manager sends the SM-SR the information for instructing the old operator to deactivate the profile along with the profile change success indication at step 379. The SM-SR notifies the old operator of the profile deactivation at step 379. Afterward, the communication is performed with the new operator using the newly installed profile at step 381.

Figure 4A:
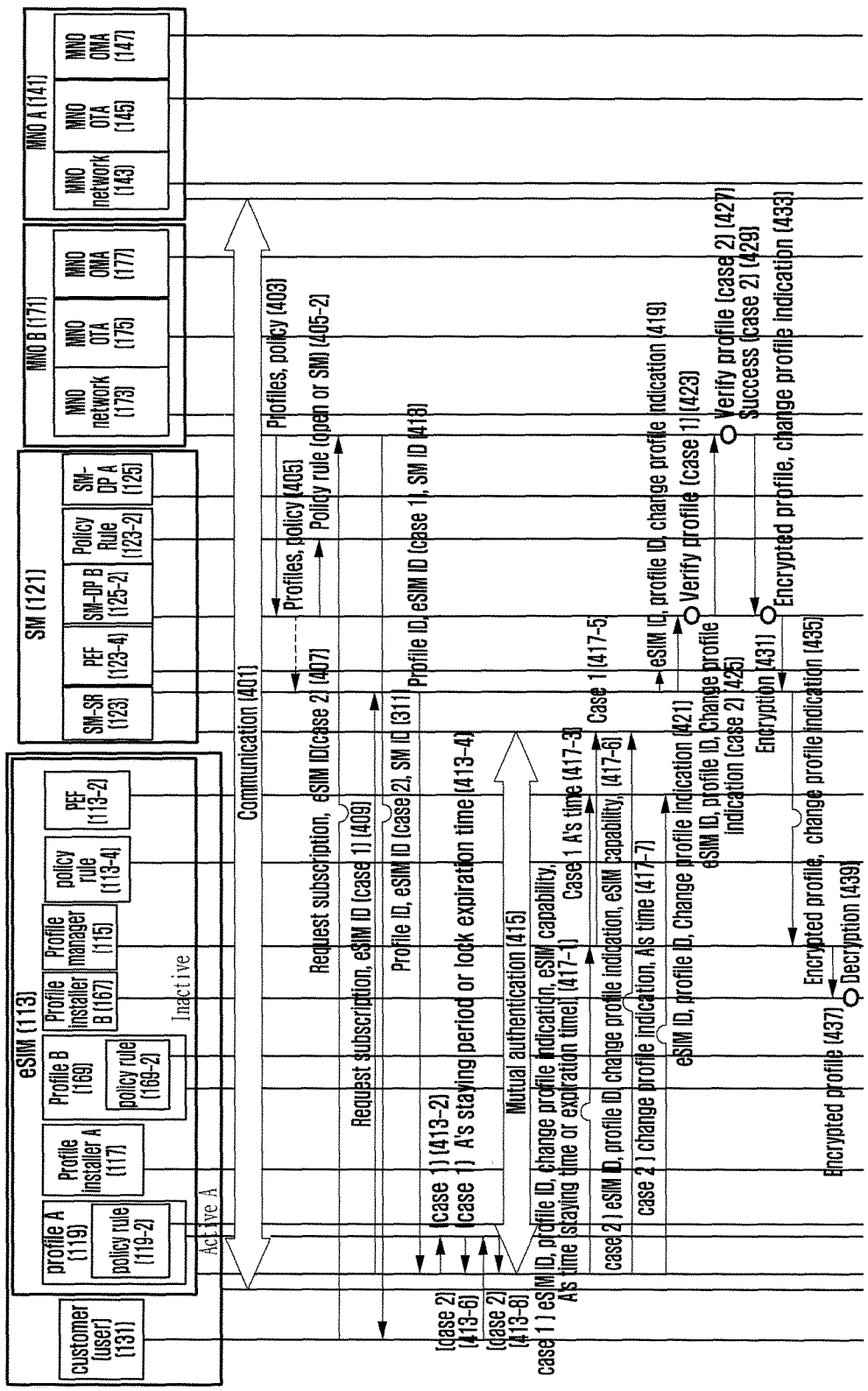
FIGS. 4A and 4B are signal flow diagrams illustrating a method for applying the policy supporting the operator change lock policy according to the second embodiment of the present invention.
Figure 4B:
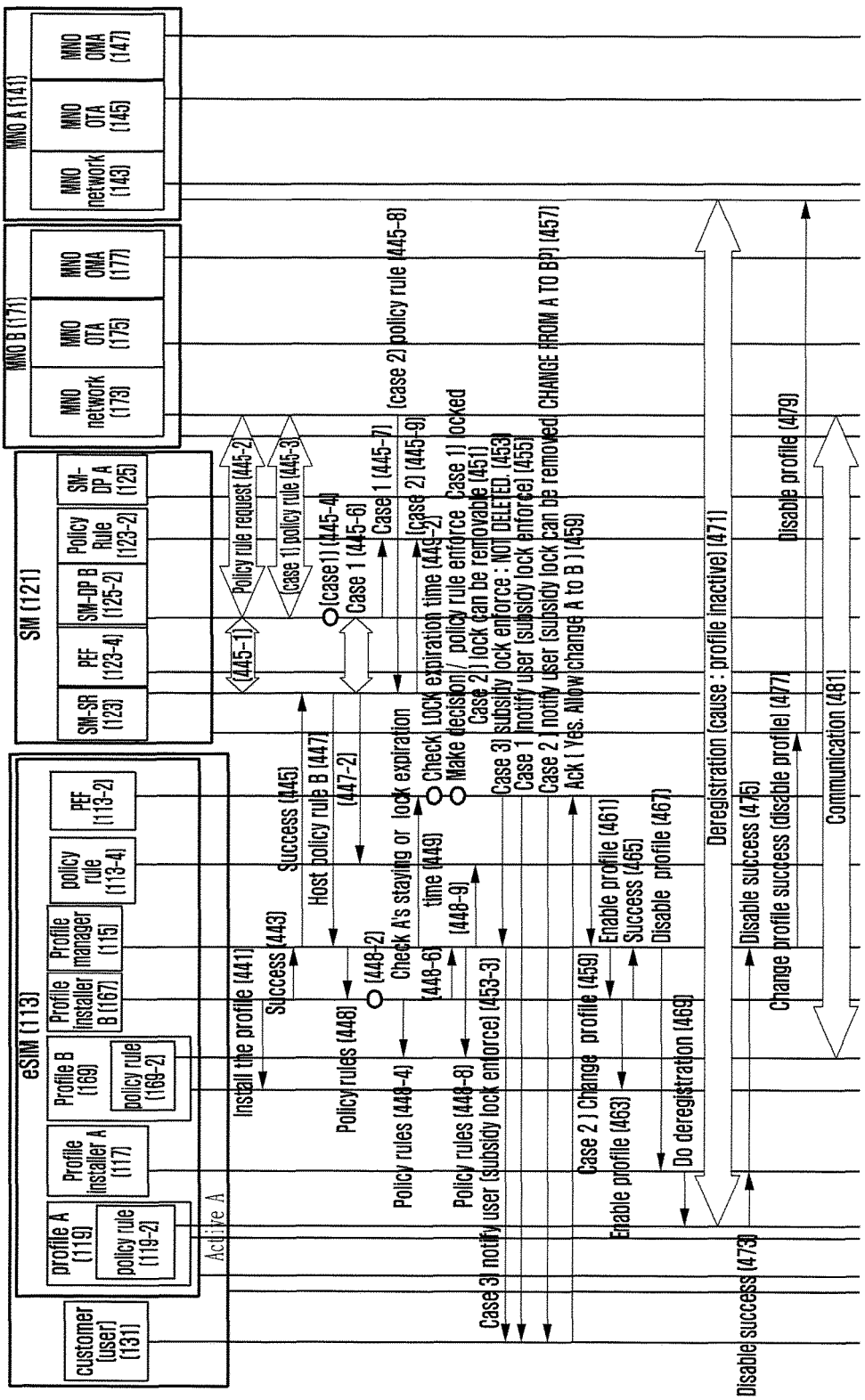

FIGS. 4A and 4B are signal flow diagrams illustrating a method for applying the policy supporting the operator change lock policy according to the second embodiment of the present invention. In detail, FIGS. 4A and 4B are signal flow diagrams illustrating a communication and security procedure for applying the policy in changing the operator according to an embodiment of the present invention. FIG. 4 is directed to an embodiment in which the eUICC is responsible for policy application and determination, i.e. lock configuration and determination.

FIG. 4 is directed to an embodiment in which the profile A is in an active state and the eSIM has 2-year agreement with the operator A. Meanwhile, the profile B is in inactive state and the user wants to switch from the operator A to the operator B.

In the following, a description is made with reference to FIG. 4A. The UE or device is communicating with the operator A using the profile information stored in the eSIM at step 401.

The profile includes a network identifier and security key K for use in communication with the operator. The identifier may include at least one of IMSI and MSISDN, and the security key may include the value of security key K corresponding to the master key stored in the Authentication Center (AUC) and Subscriber Identity Module (SIM) for use in communication with operation. The profile is comprised of an operational profile and a provisioning profile.

The operational profile includes remote files and application management information. The operational profile also includes a credential for connection to an operator network. In order to manage the contents of the profiles, the eSIM may be provided with a profile content manager which has the OTA security key of the MNO and MSISDN.

The provisioning profile provides transport capability for profile management and eSIM management between the eSIM and SM-SR.

The profile may include a profile identifier (ID), aforementioned security key, pins for OTA service identification, certificates for use in authenticating itself with the counterpart peer, parameters related to the algorithm pertaining to security or communication, application programs, operator's algorithm capability, i.e. information on the algorithms supported by the operator, and profile information indicating whether the profile is the operational profile or provisioning profile.

The MNO B (operator) may transmit the profiles to the SM at step 403. In this case, a secure connection should be established between the SM and MNO B. According to another embodiment of the present invention, the MNO (operator) may transmit the profiles to the SM-DP or SM-SR depending on the profile management type of the SM at step 405.

The MNO B may transmit the policy rule related to the corresponding profile along with the profile at step 405-2. In this case, the SM policy rule managed by the SM or policy information announced to even other operators publicly, e.g. subsidy policy (subsidy lock) information, may be managed (hosted).

The customer may send the MNO B a subscription request including the eSIM ID at step 409 or 407. The subscription request may be made through a portal site of the MNO at step 409 (case 1) or through the MNO network, wireless LAN, and Internet using the network or Internet access function of the device at step 407 (case 2).

The MNO B sends the device a profile ID, eSIM ID, SM ID, or SM address in response to the customer's subscription request at step 411 or 413. If the subscription request is made at step 409 (case 1), the MNO B sends the device the corresponding information in response to the subscription request at step 413; and if the subscription request is made at step 407 (case 2), the MNO B sends the portal site the corresponding information in response to the subscription request at step 411.

The eSIM or customer acquires a subscription continuation period for the MNO A from the profile A at steps 413-2 to 413-4 (case 1) or 413-6 to 413-8 (case 2). The eSIM makes a request to the policy rule for the subscription continuation period of the profile A and receives a response to acquire the continuation period at step 413-2 or 413-6. The user may calculate the expiration time of the lock of the profile A to read out from the policy rule at step 413-4 or 413-8.

The eSIM and SM perform an authentication procedure at step 415. The authentication may be done through an authentication method with a security key of the eSIM and a public key of the SM or a certificate authority-assisted authentication method with the certifications of the eSIM and SM.

According to an embodiment of the present invention, the eSIM sends the profile manager the eSIM identifier (ID) and profile identifier (ID), profile change indicator, eSIM capability, and continuation period or lock expiration time of profile A at step 417-1. Here, the eSIM capability denotes the capability necessary for the eSIM to generate a profile, i.e. security credential and security information.

The profile manager sends the eSIM PEF the profile change indicator and continuation period or lock expiration time of profile A at step 417-3. The profile manager sends the SM or MS-SR the eSIM ID and profile ID, profile change indicator, eSIM capability, and continuation period or lock expiration time of profile A at step 417-5.

According to another embodiment (case 2) of the present invention, the eSIM sends the SM the eSIM ID and profile ID, profile change indicator, eSIM capability, and continuation period or lock expiration time of profile A at step 417-6. The eSIM sends the eSIM PEF the profile change indicator and continuation period or lock expiration time of profile A at step 417-7.

The SM sends the SM-SR the eSIM ID and profile ID, profile change indication, and continuation period or lock expiration time of profile A at step 419. According to an embodiment of the present invention, steps 417-5, 417-6, and 419 may be performed as a single process depending on how the profile-related data are managed in the SM.

As described with reference to FIG. 1, the SM may have the SM-SR and SM-DP as separate entities and may coexist with the SM-SR 123, Policy Enforcement Function (PEF) 123-4, and SM policy rule 123-2. Meanwhile, the SM-DP may be implemented per operator for the operator network to manage its own users as denoted by reference numbers 125 and 125-2.

The SM-SR sends the SM-DP the eSIM ID, profile ID, and profile change indicator at step 421.

According to an embodiment of the present invention, the SM-DP verifies whether the profile ID is the profile ID belonging to the corresponding MNO at step 423 (case 1).

According to another embodiment of the present invention, the SM-DP (case 2-1), SM-SR (case 2-2), or SM (case 2-3) sends the MNO the profile ID and eSIM ID to verify whether the corresponding profile Ill is assigned to the eSIM at step 425. In the process, whether to transmit the profile ID and eSIM ID to the SM-DP, SM-SR, or SM is determined depending on how the profile-related data are managed in the SM.

The MNO may verify that the corresponding ID is assigned to the eSIM at step 427 (case 2).

If the verification is successful, the MNO notifies the SM-DP of the successful verification by transmitting a response message at step 429 in reply to the operation of step 423.

Afterward, the successfully verified profile ID is encrypted to generate the corresponding profile to the eSIM at step 431. The SM-DP sends the encrypted profile to the SM-SR at step 433, and the SM-SR sends the profile manager of the eSIM the encrypted profile at step 435.

Next, the encrypted profile is transmitted from the profile manager to the profile installer at step 437, and the profile installer decrypts the corresponding profile at step 439.

The profile installer may operate differently according to various embodiments of the present invention.

First, in the case that the profile installer is established per profile or profile group as denoted by reference numbers 117 and 167 in the drawing, each profile installer has to have the profile installer credential corresponding to the SM-DP and this makes it necessary for a reliable certificate authority to update the profile installer credential.

Second, in the case that the profile installer is established per profile or per profile group as denoted by reference numbers 117 and 167, a pre-configured profile installer credential exists and thus the profile installers of the SM-DP and eSIM can check the profile installer credential to use based on the index.

Third, one profile installer exists in the eSIM, i.e. the profile installers 117 and 167 are identical with each other, and there is one profile installer credential such that the SM-DP communicates with it.

A description is made with reference to FIG. 4B.

The profile installer installs the decrypted profile at step 441. The profile installer notifies the profile manager of successful installation of the profile at step 443. The profile manager notifies the SM-SR of the successful installation of the profile at step 445.

The SM-SR sends the profile manager the policy rule B such that the profile manager manages (hosts) the policy rule B in the profile B at step 447.

According to an embodiment, the policy rule B may be the policy rule transmitted by the MNO B along with the profile at steps 403 and 405 (case 1).

According to another embodiment, the policy rule B may be the one requested to the MNO via the SM-DP through steps 445-1, 445-2, 445-3, 445-4, 445-6, and 445-7 after the SM recognizes the successful installation of the profile at step 445 (case 2). That is, the policy rule B may be the policy rule acquired in such a way that the MNO sends the SM-DP a policy rule at step 445-3 and the MS-DP encrypts the policy rule at step 445-4 and transmits the encrypted policy rule to the SM-SR at step 445-6. At this time, the policy rule that may be managed by the SM-SR or SM or publicized to other operators among the policy rules related to the MNO B such as subsidy policy (e.g. subscription change lock of 2 years) may be managed according to the SM policy rule as denoted by reference number of 445-7.

According to another embodiment, the policy rule B may be the plain policy rule received from the SM-SR MNO as denoted by reference number 445-8 in response to the policy rule request made to the MNO via the SM-DP through steps 445-1 and 445-2 after it recognizes, at step 445, that the profile has been installed successfully. In the case of the policy which may be publicized to or shared by the SM or other operators, the SM-SR may host the policy rule at step 345-9.

The policy rule may be hosted according to various embodiments.

An embodiment is directed to a procedure of hosting the policy rule B to the profile B as denoted by reference numbers 448, 448-2, 448-4, and 448-6, and this procedure includes transmitting, when the policy rule B is transmitted in the encrypted state, the policy rule from the profile manager to the profile installer at step 448, decrypting the encrypted policy rule at step 448-2, transporting it into the profile at step 448-4, and reporting it from the profile installer to the profile manager at step 448-6.

In another embodiment, the policy rule is hosted into the profile by the profile manager without being encrypted as denoted by reference number 448-8.

In another embodiment, the profile manager may host the policy rule to be managed by the eSIM into the eSIM as denoted by reference number 448-9.

In another embodiment, the SM-SR may manage (host) the policy rule so as to be controlled in the eSIM as denoted by reference number 447-2.

The profile manager triggers an operation in order for the PEF to check the lock expiration time or continuation period of the profile A at step 449. The eSIM PEF checks the lock expiration time or continuation period of the profile A at step 449-2. At this time, the continuation period or lock expiration time of the profile A which has been obtained at step 417-3 or 417-7 is used.

Next, the eSIM PEF determines whether to enforce the policy rule to lock or whether the lock is removable by the operator at step 451.

In the case that the lock is configured, the eSIM PEF performs steps 453 and 455 according to an embodiment of the present invention. If the lock is configured, this means that the profile A is in the active state while the profile B is installed but not in the active state yet.

The eSIM PEF notifies the profile manager of the lock enforcement situation, i.e. that the profile A cannot be changed for another operator, at step 453; and the profile manager notifies the user of the change lock situation at step 453-3.

The eSIM PEF notifies the user that it is impossible to change to another operator at step 455.

If no lock is enforced, the eSIM PEF notifies the user of the profile change at step 457. Afterward, the user sends the eSIM PEF an acknowledgement (ack) permitting the change from profile A to profile B at step 459. The eSIM PEF may command the profile manager to enforce the profile change at step 459-2.

The profile manager may instruct the profile installer to activate (enable) the profile of the new operator at step 461. The profile installer activates the profile at step 463. If the profile of the new operator is installed successfully, the profile installer notifies the profile manager of the successful activation at step 465. According to another embodiment, step 645 may be omitted.

Afterward, the profile manager instructs the profile installer or old profile installer (when multiple profile installers exist) to deactivate (disable) the profile of the old operator at step 467.

The profile installer instructs the old profile to deregister with the old operator at step 469. The profile performs deregistration with the old operator and sets the cause value to 'profile inactive' at step 471. The cause value of 'profile inactive' may be set for the reason of the change of operator.

If the deregistration procedure is performed successfully, the old profile notifies the old profile installer of the deactivation of the profile of the old operator at step 473. According to another embodiment of the present invention, step 473 may be omitted.

The profile installer notifies the profile manager of the successful deactivation of the old profile at step 475. The profile manager sends the SM-SR the information for instructing the old operator to deactivate the profile along with the profile change success indication at step 479. The SM-SR notifies the old operator of the profile deactivation at step 479. Afterward, the communication is performed with the new operator using the newly installed profile at step 481.

Figure 5A:
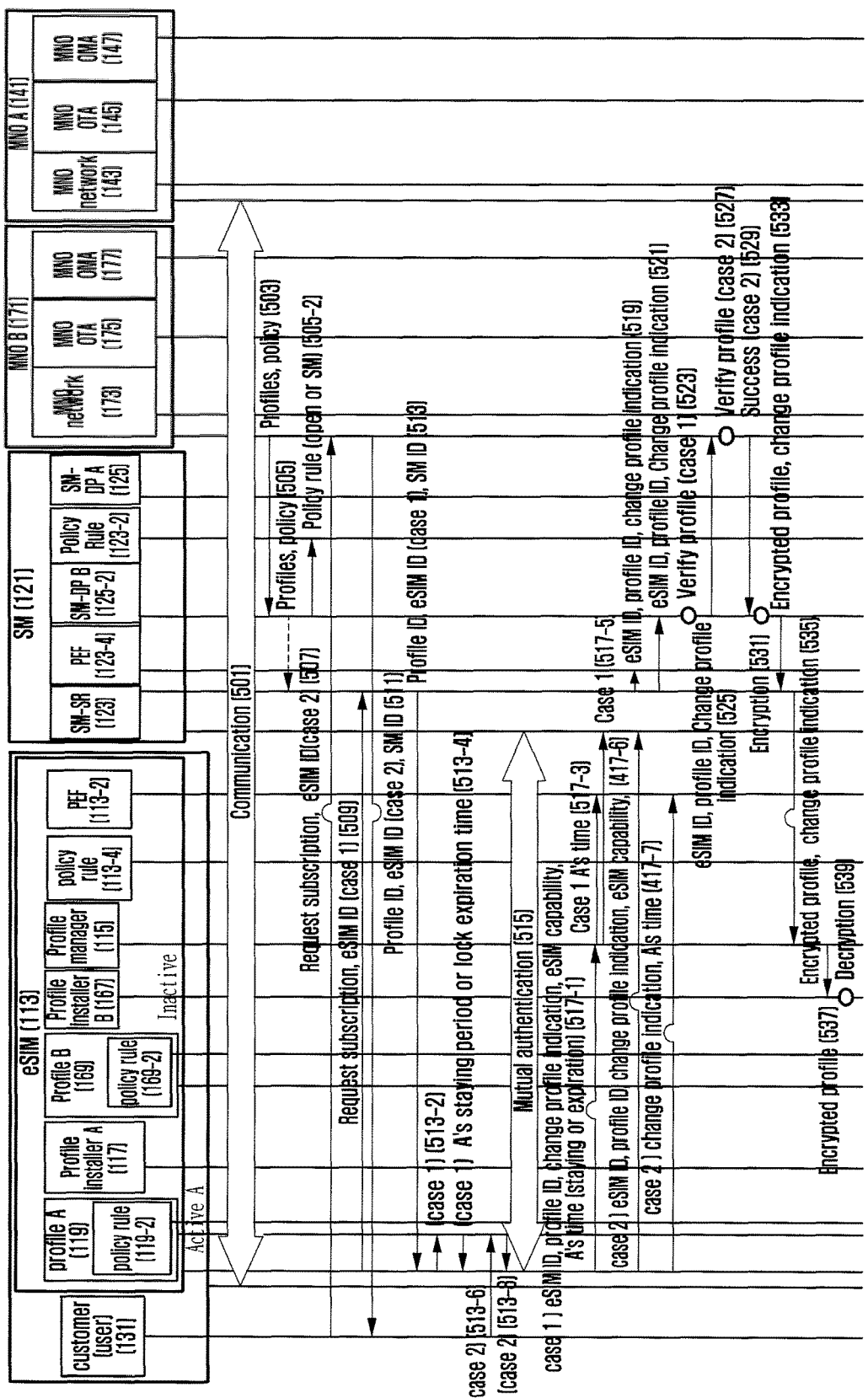
FIGS. 5A and 5B are signal flow diagrams illustrating a method for applying the policy supporting the operator change lock policy according to the third embodiment of the present invention.
Figure 5B:
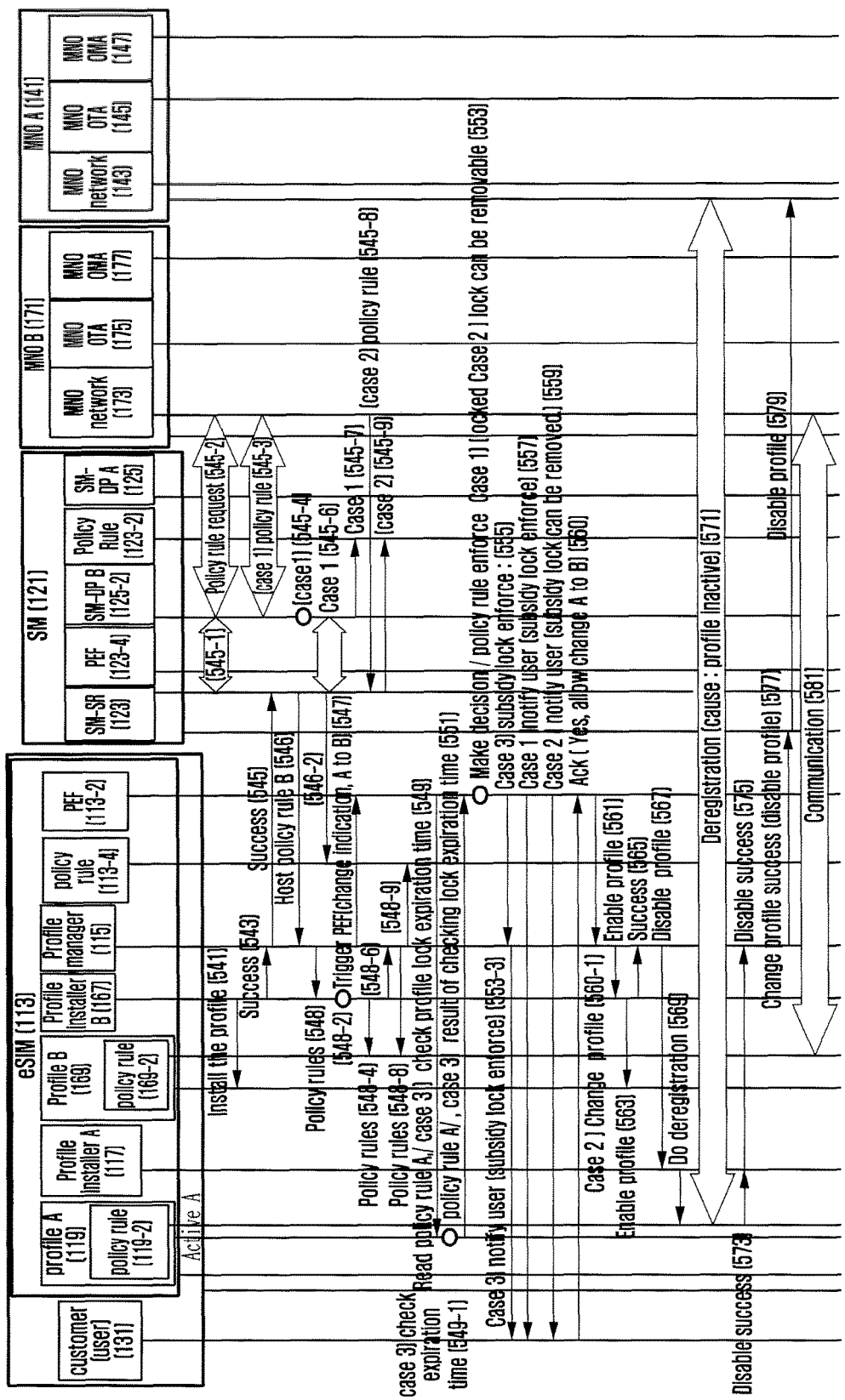

FIGS. 5A and 5B are signal flow diagrams illustrating a method for applying the policy supporting the operator change lock policy according to the third embodiment of the present invention.

In detail, FIGS. 5A and 5B are signal flow diagrams illustrating a communication and security procedure for applying the policy in changing the operator according to an embodiment of the present invention. FIG. 5 is directed to an embodiment in which the policy application and determination, i.e. lock configuration and determination, are performed in the profile.

FIG. 5 is directed to an embodiment in which the profile A is in an active state and the eSIM has 2-year agreement with the operator A. Meanwhile, the profile B is in inactive state and the user wants to switch from the operator A to the operator B.

In the following, a description is made with reference to FIG. 5A.

The UE or device is communicating with the operator A using the profile information stored in the eSIM at step 501.

The profile includes a network identifier and security key K for use in communication with the operator. The identifier may include at least one of IMSI and MSISDN, and the security key may include the value of security key K corresponding to the master key stored in the Authentication Center (AUC) and Subscriber Identity Module (SIM) for use in communication with the operator. The profile is comprised of an operational profile and a provisioning profile.

The operational profile includes remote files and application management information. The operational profile also includes a credential for connection to an operator network. In order to manage the contents of the profiles, the eSIM may be provided with a profile content manager which has the OTA security key of the MNO and MSISDN.

The provisioning profile provides transport capability for profile management and eSIM management between the eSIM and SM-SR.

The profile may include a profile identifier (ID), aforementioned security key, pins for OTA service identification, certificates for use in authenticating itself with the counterpart peer, parameters related to the algorithm pertaining to security or communication, application programs, operator's algorithm capability, i.e. information on the algorithms supported by the operator, and profile type information indicating whether the profile is the operational profile or provisioning profile.

The MNO B (operator) may transmit the profiles to the SM at step 503. In this case, a secure connection should be established between the SM and MNO B. According to another embodiment of the present invention, the MNO (operator) may transmits the profiles to the SM-DP or SM-SR depending on the profile management type of the SM at step 505.

The MNO B may transmit the policy rule related to the corresponding profile along with the profile at step 505-2. In this case, the SM policy rule managed by the SM or policy information announced to even other operators publicly, e.g. subsidy policy (subsidy lock) information, may be managed (hosted).

The customer may send the MNO B a subscription request including the eSIM ID at step 509 or 507. The subscription request may be made through a portal site of the MNO at step 509 (case 1) or through the MNO network, wireless LAN, and Internet using the network or Internet access function of the device at step 507 (case 2).

The MNO B sends the device a profile ID, eSIM ID, SM ID, or SM address in response to the customer's subscription request at step 511 or 513. If the subscription request is made at step 509 (case 1), the MNO B sends the device the corresponding information in response to the subscription request at step 413; and if the subscription request is made at step 507 (case 2), the MNO B sends the portal site the corresponding information in response to the subscription request at step 511.

The eSIM or customer acquires a subscription continuation period for the MNO A from the profile A at steps 513-2 to 513-4 (case 1) or 513-6 to 513-8 (case 2). The eSIM makes a request to the policy rule for the subscription continuation period of the profile A and receives a response to acquire the continuation period at step 513-2 or 513-6. The user may calculate the expiration time of the lock of the profile A to read out from the policy rule at step 513-4 or 513-8.

The eSIM and SM perform an authentication procedure at step 515. The authentication may be done through an authentication method with a security key of the eSIM and a public key of the SM or an authentication organization-assisted authentication method with the certifications of the eSIM and SM.

According to an embodiment of the present invention, the eSIM sends the profile manager the eSIM identifier (ID) and profile identifier (ID), profile change indicator, eSIM capability, and continuation period or lock expiration time of profile A at step 517-1. Here, the eSIM capability denotes the capability necessary for the eSIM to generate a profile, i.e. security credential and security information. The profile manager sends the eSIM PEF the profile change indicator and continuation period or lock expiration time of profile A at step 517-3. The profile manager sends the SM or MS-SR the eSIM ID and profile ID, profile change indicator, eSIM capability, and continuation period or lock expiration time of profile A at step 517-5.

According to another embodiment (case 2) of the present invention, the eSIM sends the SM the eSIM ID and profile ID, profile change indicator, eSIM capability, and continuation period or lock expiration time of profile A at step 517-6. The eSIM sends the eSIM PEF the profile change indicator and continuation period or lock expiration time of profile A at step 517-7.

The SM sends the SM-SR the eSIM ID and profile ID, profile change indication, and continuation period or lock expiration time of profile A at step 519. According to an embodiment of the present invention, steps 517-5, 517-6, and 519 may be performed as a single process depending on how the profile-related data are managed in the SM.

As described with reference to FIG. 1, the SM may have the SM-SR and SM-DP as separate entities and may coexist with the SM-SR 123, Policy Enforcement Function (PEF) 123-4, and SM policy rule 123-2. Meanwhile, the SM-DP may be implemented per operator for the operator network to manage its own users as denoted by reference numbers 125 and 125-2.

The SM-SR sends the SM-DP the eSIM ID, profile Ill, and profile change indicator at step 521.

According to an embodiment of the present invention, the SM-DP verifies whether the profile ID is the profile ID belonging to the corresponding MNO at step 523 (case 1).

According to another embodiment of the present invention, the SM-DP (case 2-1), SM-SR (case 2-2), or SM (case 2-3) sends the MNO the profile ID and eSIM ID to verify whether the corresponding profile ID is assigned to the eSIM at step 525. In the process, whether to transmit the profile ID and eSIM ID to the SM-DP, SM-SR, or SM is determined depending on how the profile-related data are managed in the SM.

The MNO may verify that the corresponding ID is assigned to the eSIM at step 527 (case 2).

If the verification is successful, the MNO notifies the SM-DP of the successful verification by transmitting a response message at step 529 in reply to the operation of step 523.

Afterward, the successfully verified profile ID is encrypted to generate the corresponding profile to the eSIM at step 531. The SM-DP sends the encrypted profile to the SM-SR at step 533, and the SM-SR sends the profile manager of the eSIM the encrypted profile at step 535.

Next, the encrypted profile is transmitted from the profile manager to the profile installer at step 537, and the profile installer decrypts the corresponding profile at step 539.

The profile installer operates according to various embodiments of the present invention.

First, in the case that the profile installer is established per profile or profile group as denoted by reference numbers 117 and 167 in the drawing, each profile installer has to have the profile installer credential corresponding to the SM-DP and this makes it necessary for a reliable certificate authority to update the profile installer credential.

Second, in the case that the profile installer is established per profile or per profile group as denoted by reference numbers 117 and 167, a pre-configured profile installer credential exists and thus the profile installers of the SM-DP and eSIM can check the profile installer credential to use based on the index.

Third, one profile installer exists in the eSIM, i.e. the profile installers 117 and 167 are identical with each other, and there is one profile installer credential such that the SM-DP communicates with it.

A description is made with reference to FIG. 5B.

The profile installer installs the decrypted profile at step 541.

The profile installer notifies the profile manager of successful installation of the profile at step 543. The profile manager notifies the SM-SR of the successful installation of the profile at step 545.

The SM-SR sends the profile manager the policy rule B such that the profile manager manages (hosts) the policy rule B in the profile B at step 546.

According to an embodiment, the policy rule B may be the policy rule transmitted by the MNO B along with the profile at steps 503 and 505 (case 1).

According to another embodiment, the policy rule B may be the policy rule obtained in such a way that the SM, after knowing that the profile is installed successfully at step 545, requests the MNO to transmit the policy rule via the SM-DP at steps 545-1 and 545-2, the SM-DP encrypts the policy rule at step 545-4, the SM-DP transmits the encrypted policy rule of the MNO to the SM-SR at step 545-6. At this time, the policy rule that may be managed by the SM-SR or SM or publicized to other operators among the policy rules related to the MNO B such as subsidy policy (e.g. subscription change lock of 2 years) may be managed according to the SM policy rule as denoted by reference number of 545-7.

According to another embodiment, the policy rule B may be the plain policy rule transmitted from the MNO to the SM-SR as denoted by reference number 545-8 in response to the policy rule request made to the MNO via the SM-DP through steps 545-1 and 545-2 after it recognizes, at step 545, that the profile has been installed successfully. In the case of the policy which is supposed to be publicized or shared by the SM or other operators, the SM-SR may host the policy rule at step 545-9.

The policy rule may be hosted according to various embodiments.

An embodiment is directed to a procedure of hosting the policy rule B to the profile B as denoted by reference numbers 548, 548-2, 548-4, and 548-6, and this procedure includes transmitting, when the policy rule B is transmitted in the encrypted state, the policy rule from the profile manager to the profile installer at step 548, decrypting the encrypted policy rule at step 548-2, transporting it into the profile at step 548-4, and reporting it from the profile installer to the profile manager at step 548-6.

In another embodiment, the policy rule is hosted into the profile by the profile manager without being encrypted as denoted by reference number 548-8.

In another embodiment, the profile manager may host the policy rule to be managed by the eSIM into the eSIM as denoted by reference number 548-9.

In another embodiment, the SM-SR may manage (host) the policy rule so as to be controlled in the eSIM as denoted by reference number 546-2.

In separation from hosting the policy rule at steps 546 to 548, the profile manager triggers an operation in order for the PEF to make a policy decision and enforce the policy rule at step 547. That is, the profile manager sends the eSIM PEF the information on a profile change indicator indicating the change from profile A to profile B to trigger PEF operation. The PEF may be capable of enforcing the policy rule according to various embodiments (three embodiments herein): an embodiment (case 1) in which the policy rule enforcement is determined based on the profile lock expiration time or profile continuation period received at step 517-3 and another embodiment (case 2) in which the policy rule enforcement is determined based on the profile lock expiration time or profile continuation period received at step 517-7, and another embodiment (case 3) in which the policy rule enforcement is determined in such a way of reading the policy rule A existing in the profile to check the profile lock expiration time or profile continuation period at step 549, 549-1, and 551. A description is made of the last embodiment (case 3) associated with steps 549, 549-1, and 551 in detail: the PEF requests to the profile A for reading the policy rule A and checking the lock expiration time or continuation period of profile A at step 549. The profile A checks the lock expiration time or continuation period of profile A and reads the policy rule A at step 549-1. Next, the profile A transmits the policy rule A and the lock expiration time or continuation period of profile A at step 551. According to another embodiment, the profile A may compare the expiration time or continuation period of profile A with a period required in the policy rule A and transmits the comparison result or yes/no (true/false) indication in order for the PEF to determine whether to configure the lock or not at step 553.

The eSIM PEF determines whether to enforce the policy rule to lock or whether the lock is removable by the operator at step 553.

In the case that the lock is configured, the eSIM PEF may operate according to an embodiment (case 3) or another embodiment (case 1). If the lock is configured, this means that the profile A is in the active state while the profile B is installed but not in the active state yet. In an embodiment (case 3), e.g. if the 2-year agreement of subscription for the MNO A is not expired and thus change from operator A to operator B is impossible, the eSIM PEF notifies the profile manager of the lock enforcement situation in which the change from operator A to operator B is not allowed, at step 555, and the profile manager notifies the user that the operator change is not allowed at step 555-3. In another embodiment (case 1), the eSIM PEF notifies the user that the change to any operator is not allowed at step 557. In another embodiment (case 2), if the lock is not enforced, i.e. if the period agreed with the operator A (e.g. 2-year agreement period) has expired and thus it is possible to change the operator, the eSIM PEF notifies the user of the profile change at step 559. If the profile change is notified to the user at step 559, the user may enter an acknowledgement (ack) permitting the change from profile A to profile B at step 560. The eSIM PEF may command the profile manager to enforce the profile change at step 560-1.

Afterward, the profile manager may instruct the profile installer to activate (enable) the profile of the new operator at step 561. The profile installer activates the profile at step 563. If the profile of the new operator is installed successfully, the profile installer notifies the profile manager of the successful activation at step 565. According to another embodiment, step 545 may be omitted. Afterward, the profile manager instructs the profile installer or old profile installer (when multiple profile installers exist) to deactivate (disable) the profile of the old operator at step 567. The profile installer instructs the old profile to deregister with the old operator at step 569. The profile performs deregistration with the old operator and sets the cause value to 'profile inactive' at step 571. The cause value of 'profile inactive' may be set for the reason of the change of operator. If the deregistration procedure is performed successfully, the old profile notifies the old profile installer of the deactivation of the profile of the old operator at step 573. According to another embodiment of the present invention, step 573 may be omitted. The profile installer notifies the profile manager of the successful deactivation of the old profile at step 575. The profile manager sends the SM-SR the information for instructing the old operator to deactivate the profile along with the profile change success indication at step 579. The SM-SR notifies the old operator of the profile deactivation at step 579. Afterward, the communication is performed with the new operator using the newly installed profile at step 581.

Figure 6A:
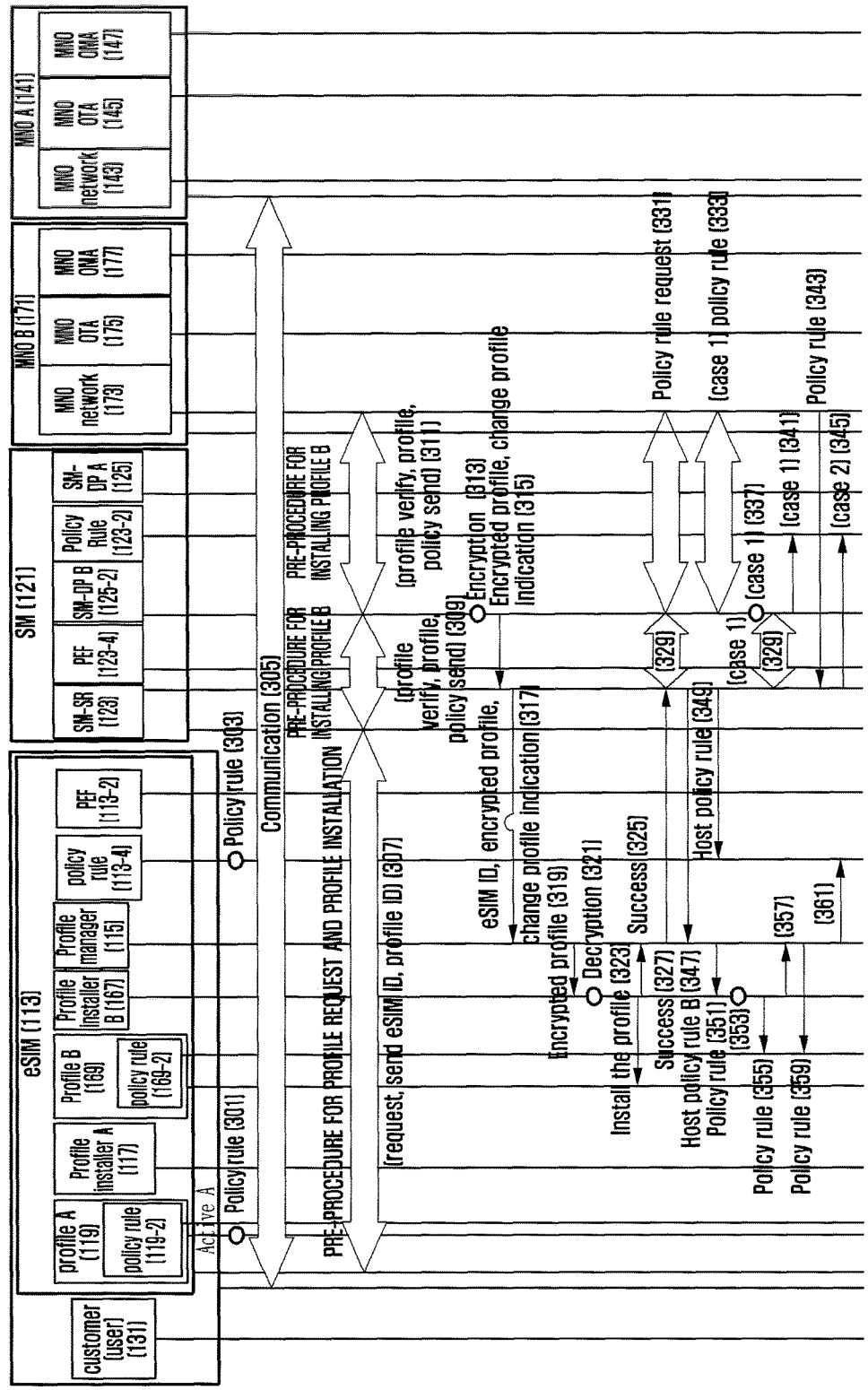
FIGS. 6A and 6B are signal flow diagrams illustrating a method for applying the policy in changing the profile according to the third embodiment of the present invention.
Figure 6B:
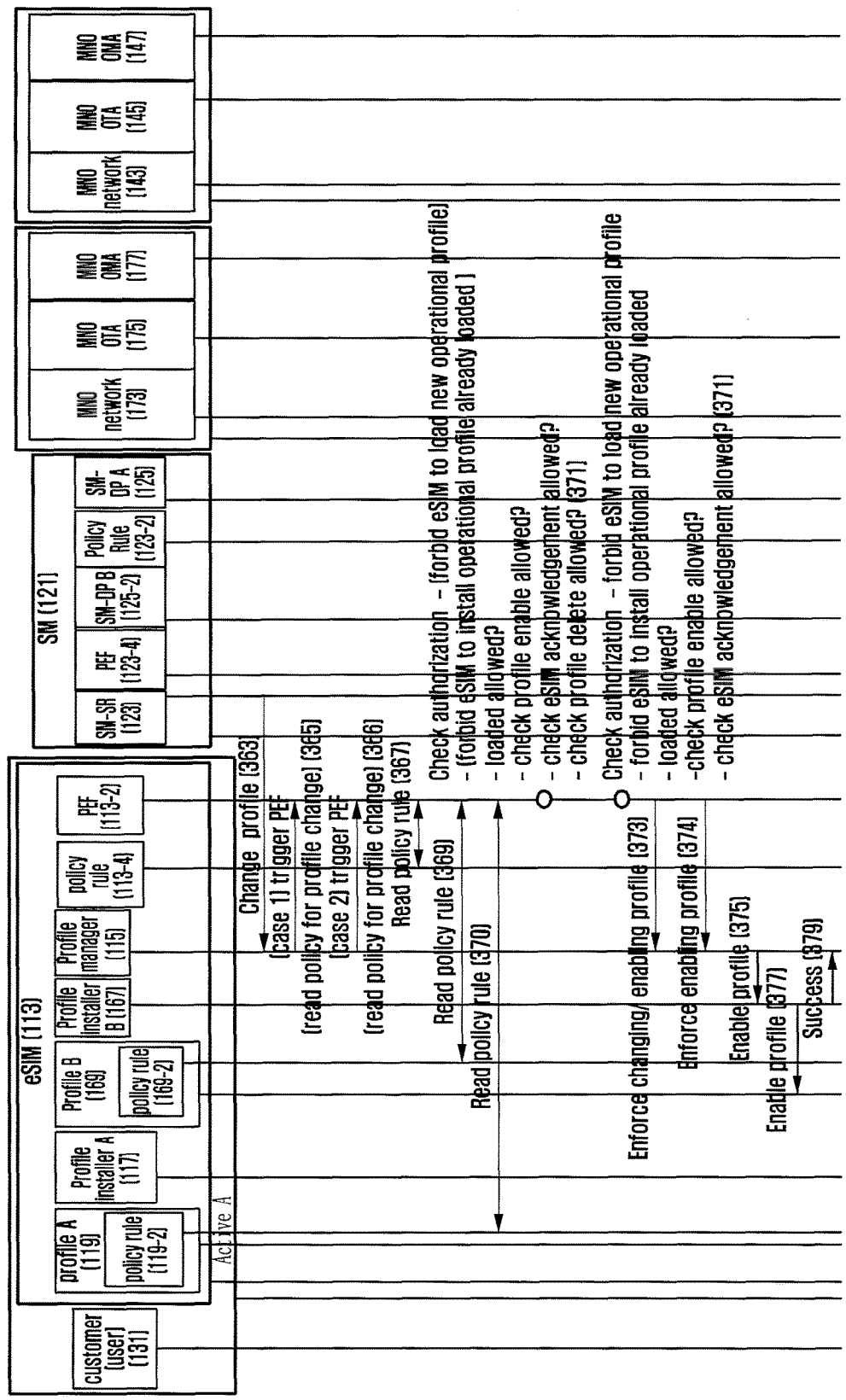

FIGS. 6A and 6B are signal flow diagrams illustrating a method for applying the policy in changing the profile according to the third embodiment of the present invention. (도 6A~도 6C 존재)

Figure 6C:
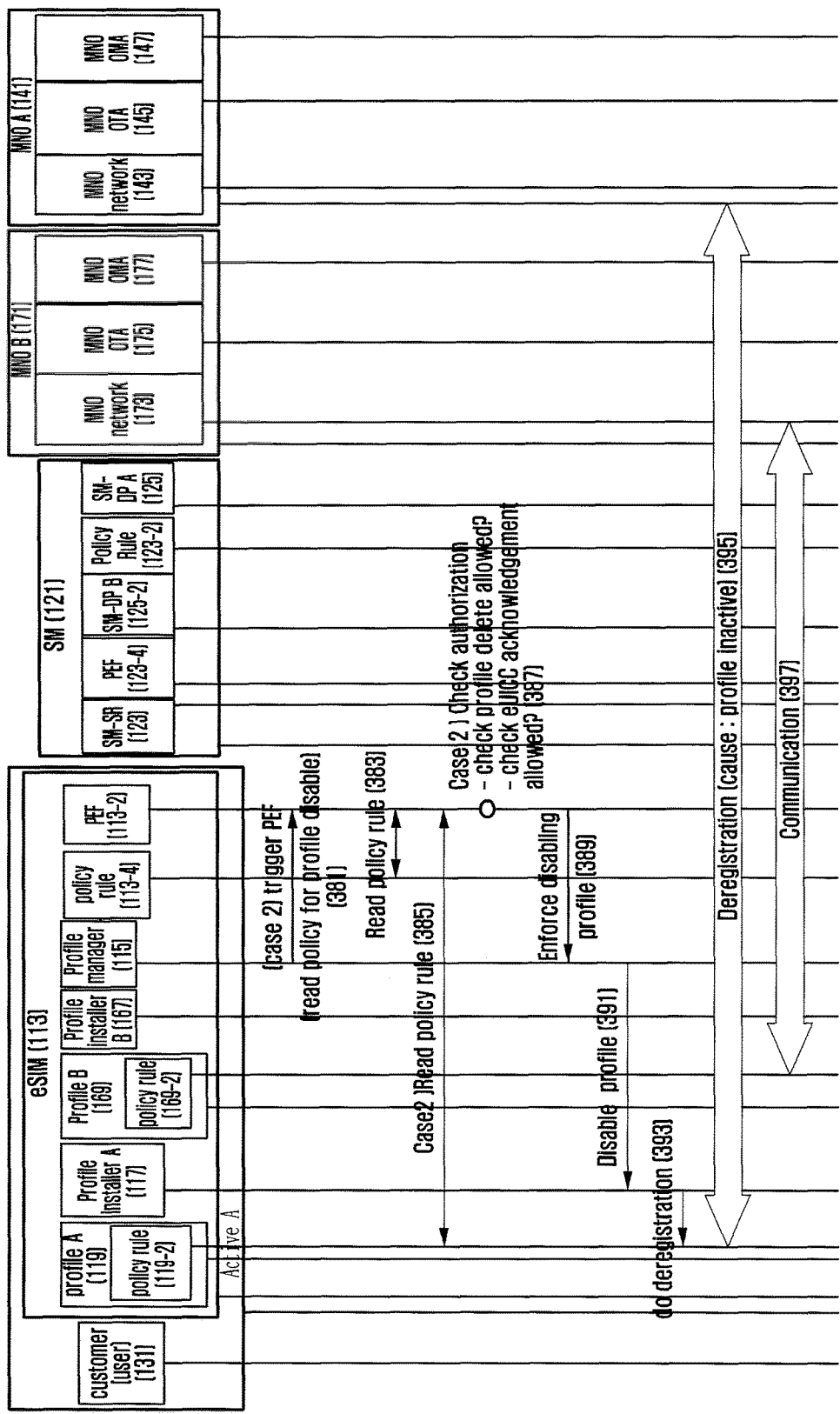

FIG. 6 is directed to an embodiment in which policy application and determination, i.e. lock configuration and determination, is performed in the eSIM. In the embodiment of FIG. 6, it is assumed that the profile A is in the active state, and the user wants to change from operator A to operator B.

The profile A includes a related policy rule at step 601. The eSIM includes the eSIM-related policy rule information at step 603. Also, the SM, e.g. SM-SR, includes the policy rule at step 604. At steps 601, 603, and 604, the UE has the eSIM and stored profile information already, and the eSIM, profile, SM, SM-SR, and SM-DP are configured for communication with the operator A. The UE is also in the state of communicating with the operator A at step 605.

The profile includes a network identifier and security key K for use in communication with the operator, and the identifier may include at least one of IMSI and MSISDN. The security key may be the master key stored in the Authentication Center (AUC) and Subscriber Identity Module (SIM) for use in communication with the operator.

The profile is comprised of an operational profile and a provisioning profile. The operational profile includes remote files and application management information. The operational profile also includes a credential for connection to an operator network. In order to manage the contents of the profiles, the eSIM may be provided with a profile content manager which has the OTA security key of the MNO and MSISDN.

The provisioning profile provides transport capability for profile management and eSIM management between the eSIM and SM-SR.

The profile may include a profile identifier (ID), aforementioned security key, pins for OTA service identification, certificates for use in authenticating itself with the counterpart peer, parameters related to the algorithm pertaining to security or communication, application programs, operator's algorithm capability, i.e. information on the algorithms supported by the operator, and profile type information indicating whether the profile is the operational profile or provisioning profile.

The eSIM requests the SM to transmit a profile and install the profile at step 607. That is, the eSIM sends the SM the eSIM ID, profile ID, and eSIM capability indicator. Here, the eSIM capability denotes the capability necessary for the eSIM to generate a profile, i.e. security credential and security information.

The SM verifies the profile ID transmitted for use in installing the profile at step 609. Step 609 shows only the relationship between the SM or SM-SR and SM-DP comprehensively.

The SM-DP verifies the profile to install and sends the profile received from the operator to the SM at step 611. At this time, the policy may be transmitted from the operator (MNO) to the SM along with the profile or separately.

The policy rule may include the SM policy rule to be managed by the SM, policy rules to be notified to other operators publicly, and the policy rule to be managed by the eSIM. The subscription request process comprised of steps 607, 609, and 611 may be performed in such a way that the user uses the network or Internet access function of the device (i.e. UE) or makes a subscription request in the operator (MNO) portal.

The profile ID is transmitted by the MNO in response to the request from the subscriber. For steps 607 and 609, the eSIM and SM have to perform an authentication procedure. The authentication may be done through an authentication method with a security key of the eSIM and a public key of the SM or a certificate authority-assisted authentication method in which the certificate authority authenticates the certifications of the eSIM and SM.

The SM-SR and SM-DP may be implemented as separate entities as shown in FIG. 1 or included in the PEF 123-4 and SM policy rule 123-2. The SM-DP may be established per operator to manage per-operator network users as denoted by reference number 125 and 125-2.

The operator-specific profile ID verification may be performed by the SM-DP, SM-SR, or the corresponding MNO, and the verification function and procedure may vary depending on the embodiment.

The profile corresponding to the verified profile Ill is encrypted at step 613. The SM-DP sends the SM-SR the encrypted profile at step 615, and the SM-SR sends the profile manager of the eSIM the encrypted profile at step 617. Afterward, the profile manager sends the profile installer the encrypted profile at step 619, and the profile installer decrypts the corresponding profile at step 621.

The profile installer operates differently according to various embodiments.

In the first embodiment, if the profile installer is established per profile or profile group as denoted by reference numbers 117 and 167 in the drawing, each profile installer has to have the profile installer credential corresponding to the SM-DP and this makes it necessary for a reliable certificate authority to update the profile installer credential.

In the second embodiment, if the profile installer is established per profile or per profile group as denoted by reference numbers 117 and 167, a pre-configured profile installer credential exists and thus the profile installers of the SM-DP and eSIM can check the profile installer credential to use based on the index.

In the third embodiment, one profile installer exists in the eSIM and thus there is one profile installer credential such that the SM-DP communicates with it The profile installer installs the decrypted profile at step 623. The profile installer notifies the profile manager of successful installation of the profile at step 625. The profile manager notifies the SM-SR of the successful installation of the profile at step 627. The SM-SR sends the profile manager the policy rule B such that the profile manager manages (hosts) the policy rule B in the profile B at step 647.

At this time, the policy rule B may be the policy rule transmitted by the MNO B along with the profile (case 1). Also, the policy rule B may be the policy rule obtained in such a way that the SM, after knowing that the profile is installed successfully at step 627, requests the MNO to transmit the policy rule via the SM-DP at steps 629 and 631, the MNO sends the SM-DP the policy rules at steps 633, 637, 639, and 641, the SM-DP encrypts the policy rule at step 637, the SM-DP transmits the encrypted policy rule to the SM-SR at step 639. Also, the policy rule B may be the plain policy rule transmitted from the MNO to the SM-SR at step 643 in response to the request from the SM-DP to the MNO at steps 329 and 331 after recognizing that the profile has been installed successfully at step 627. In the case of the policy which is supposed to be publicized or shared by the SM or other operators, the SM-SR may host the policy rule at step 645.

The policy rule may be hosted according to various embodiments.

An embodiment is directed to a procedure of hosting the policy rule B to the profile B as denoted by reference numbers 651, 653, 655, and 657, and this procedure includes transmitting, when the policy rule B is transmitted in the encrypted state, the policy rule from the profile manager to the profile installer at step 651, decrypting the encrypted policy rule at step 653, transporting it into the profile at step 655, and reporting it from the profile installer to the profile manager at step 657.

In another embodiment, the policy rule is hosted into the profile by the profile manager without being encrypted as denoted by reference number 659.

In another embodiment, the profile manager may host the policy rule to be managed by the eSIM into the eSIM as denoted by reference number 661.

In another embodiment, the SM-SR may manage (host) the policy rule so as to be controlled in the eSIM as denoted by reference number 649.

In summary, the policy rule hosting procedure is comprised of 1) a process of hosting the policy in the eSIM, 2) a process of hosting the policy rule in the profile, and 3) a process of hosting the policy rule in the SM.

If a profile-related command is received from the SM-SR after hosting the policy rule, the profile manager triggers an operation in order for the PEF to makes a police rule enforcement decision by reflecting the policy. For example, if a profile change command is received from the SM-SR at step 663, the profile manager triggers the PEF operation at step 665. That is, the profile manager sends the eSIM PEF the profile change indication along with the information on the change from profile A to profile B to trigger the PEF operation.

Since this embodiment is directed to the exemplary case where the profile manager changes the active profile (e.g. change from profile A of the operator A to profile B of the operator B), i.e. the operator, the description of steps 665 to 697 are made based thereon.

If the profile change command is transmitted from the SM-R to the profile manager at step 663, the profile manager may operate as follows according to various embodiments.

In an embodiment (case 1), the profile manager reads the eSIM policy rule and the policy rules of the old profile A and a new profile B, determines whether it is possible to enable the profile B based on its policy rule and whether it is possible to disable the profile A based on its policy rule, and performs enabling profile B and disabling profile A. In case 1, the procedure is performed in the order of 663→665→667, 669, 670→671→673→675→677→679→691→693→695→697.

In another embodiment (case 2), the profile manager reads the policy rule of the profile B to enable the profile B and then trigger the PEF to disable the profile A. In case 2, the procedure is performed in the order of 663→666→667, 669→672→673→675→677→679→681→683, 685→687→689→691→693→695→697.

Descriptions are made of the respective embodiments hereinafter.

In case 1, the profile manager triggers the PEF to read the profile change-related policy and verify the policy afterward at step 665. The PEF reads the policy rule of the eSIM at step 667. The PEF reads the policy rule of the profile B (i.e. the newly installed profile) at step 669. The PEF reads the policy rule of the profile A (i.e. the previously activated profile) at step 670. Afterward, the PEF may check the authorization on whether it is prohibited to load the new operational profile on the eSIM (in this case, the policy rule is being managed in the eSIM at step 603), whether it is prohibited to enable the operational profile loaded already, whether it is allowed to enable the profile, or whether it is possible for the eSIM to transmit an acknowledgement message in response to the command from the outside such as SM. The PEF may check the authorization on whether it is allowed to disable or delete the profile A based on the policy rule A at step 671.

At this time, if the two policies mismatch and conflict to each other, the PEF has to prioritize them. The priorties have to be determined according to a rule preconfigured by the operator, a rule agreed among the operators, or a rule among the operators sharing the SM or Sm-SR managing the eSIM.

In an embodiment, if the policy rule stored in the eSIM has the priority, the PEF applies the policy rule of the eSIM with priority. That is, if it is not allowed to enable the profile loaded already but it is allowed to enable the profile in the profile B, the enablement of the profile B may be not be allowed during the eSIM lock period configured due to the policy rule of the eSIM with the high priority. This may be the case when the lock is configured to the eSIM due to the subsidy policy.

In contrast, if the policy rule of the profile has the priority higher than that of the policy rule of the eSIM, the PEF applies the policy rule of the profile with priority. This may be the case when the policy rule of the eSIM allowed to be enabled while the policy rule of the profile is not allowed to be enabled due to a reason such as profile lock. An example is that, when a user subscribed to the operator B moves to the operator A and then comes back to the operator B to use the previously loaded profile, the reuse or enablement of the old profile is locked.

Afterward, the eSIM PEF enforces the profile change policy (case 1-1) or the profile enable policy (case 1-2). In detail, the eSIM PEF notifies the profile manager that the profile change/enable is allowed.

Since the embodiment of FIG. 6 is directed to the procedure of changing the operator change from profile A to profile B, the profile manager may enable the profile B or enforces the policy at step 673 and enforces the policy of disabling the old profile, i.e. profile A at step 689 (case 1). In the case of enforcing the profile change policy at step 673, the profile manager notifies the outside entity of the enforcement of the profile change using an indicator as denoted by reference number 679 and performs step 691 so as to improve the procedure efficiency. In the case of enforcing the policy enabling the profile B, it is possible to improve the procedure efficiency by performing step 691 since the profile manager has already verified the policy rule.

Subsequent to step 673, the profile manager may instruct the profile installer to activate (enable) the profile of the target operator at step 675. The profile installer activates the profile at step 677. If the profile of the target operator is activated successfully, the profile installer notifies the profile manager of the successful activation at step 679. Step 679 may be omitted depending on an embodiment.

Afterward, the profile manager commands the profile installer or the old profile installer (when multiple profile installers exist) to disable (inactivate) the profile of the old operator at step 691. The profile installer instructs the old profile to deregister with the old operator at step 693. The profile performs deregistration with the old operator and sets the cause value to 'profile inactive' at step 695. The cause value of 'profile inactive' may be set for the reason of the change of operator. Afterward, the profile manager communicates with the new operator using the newly installed profile at step 697.

In another embodiment, the profile manager reads the policy rule of the profile B to enable the profile B and triggers the PEF to disable the profile A (case 2). In this case, the procedure is performed in the order of 663→666→667, 669→672→674→675→677→679→681→(683:667), 685→687→689→691→693→695→697. In the following, the description is mainly directed to differently operating part as compared to case 1.

The profile manager triggers the PEF to read the profile policy afterward at step 666. The profile manager may check the authorization for prohibiting the load of new operational profile to the eSIM or the enablement of the operation profile loaded already, for allowing for the enablement of the profile or allowing the eSIM to transmit an acknowledgement in response to a command from an outside entity such as SM. The profile manager enforces the policy of enabling the profile at step 674.

Next, the profile manager triggers the PEF to read and verify the policy afterward at step 681.

The PEF reads the policy rule of the eSIM at step 683 which may be omitted because it is identical with step 667. The PEF reads the policy rule of the profile A (i.e., the profile activated already) at step 685. Afterward, the PEF may check the authorization on whether the eSIM is capable of transmitting an acknowledgement message in response to a command from an outside entity such as SM based on the policy rule A or eSIM policy rule at step 687. Alternatively, the PEF also may check the authorization for whether disabling or deleting the profile A is granted based on the policy rule A at step 687. Afterward, the eSIM PEF enforces the profile disable policy. That is, the eSIM PEF notifies the profile manager that it is possible to disable the profile.

Figure 7:
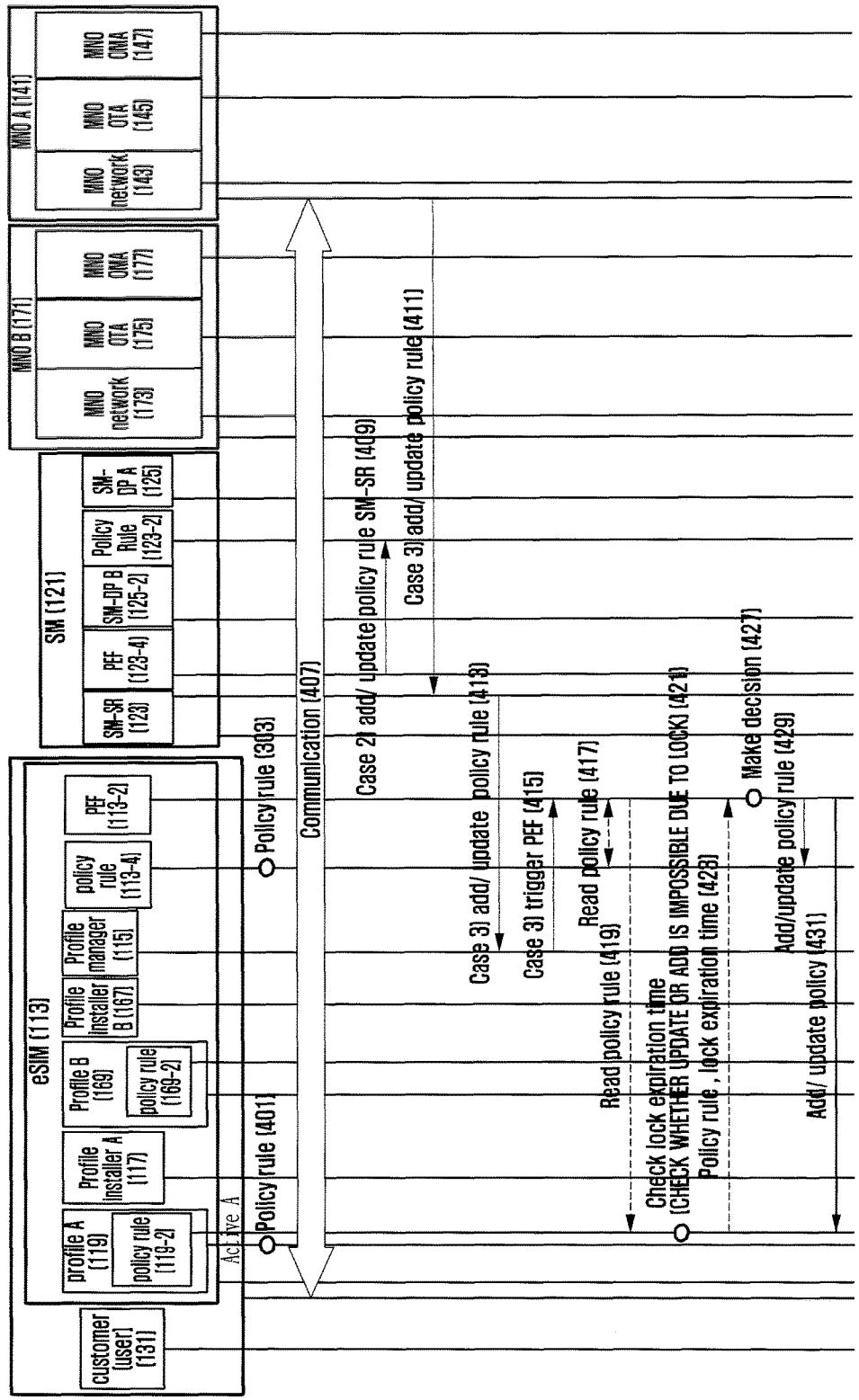
FIGS. 7A and 7B are signal flow diagrams illustrating a method of adding and updating a policy in changing a profile according to the first embodiment of the present invention.

FIGS. 7A and 7B are signal flow diagrams illustrating a method of adding and updating a policy in changing a profile according to the first embodiment of the present invention.

The profile A has the policy rule information related to profile A at step 701. The eSIM has the policy rule information related to the eSIM at step 703. The SM, e.g. SM-SR, has the policy rule too at step 705. At steps 701, 703, and 705, the eSIM, profile, SM, SM-SR, and SM-DP have been already configured such that the UE is capable of communicating with the operator A using the profile information stored in the eSIM; and the UE and the operator A are communicating at step 707.

The SM PEF generates a policy rule add or update command to add or update the policy rule at step 709 (case 1). If the MNO notifies the SM or SM-SR of the policy rule add/update at step 711, the SM-SR sends the profile manager a policy rule add/update request received from the MNO (case 3). The profile manager triggers the PEF to add/update the policy rule at step 715. Next, the PEF reads the eSIM policy rule at step 717 and reads the policy rule of profile A at step 719. Next, the PEF checks the lock expiration time to determine whether the policy rule is locked or allowed for add/update at step 721. The PEF receives the policy rule read from the profile A and the lock expiration time at step 723 and determines whether the policy rule add/update is allowed at step 727. The PEF enforces the add/update policy for the eSIM policy rule at step 729 and carries out the policy rule add/update in association with the profile A.

Figure 8A:
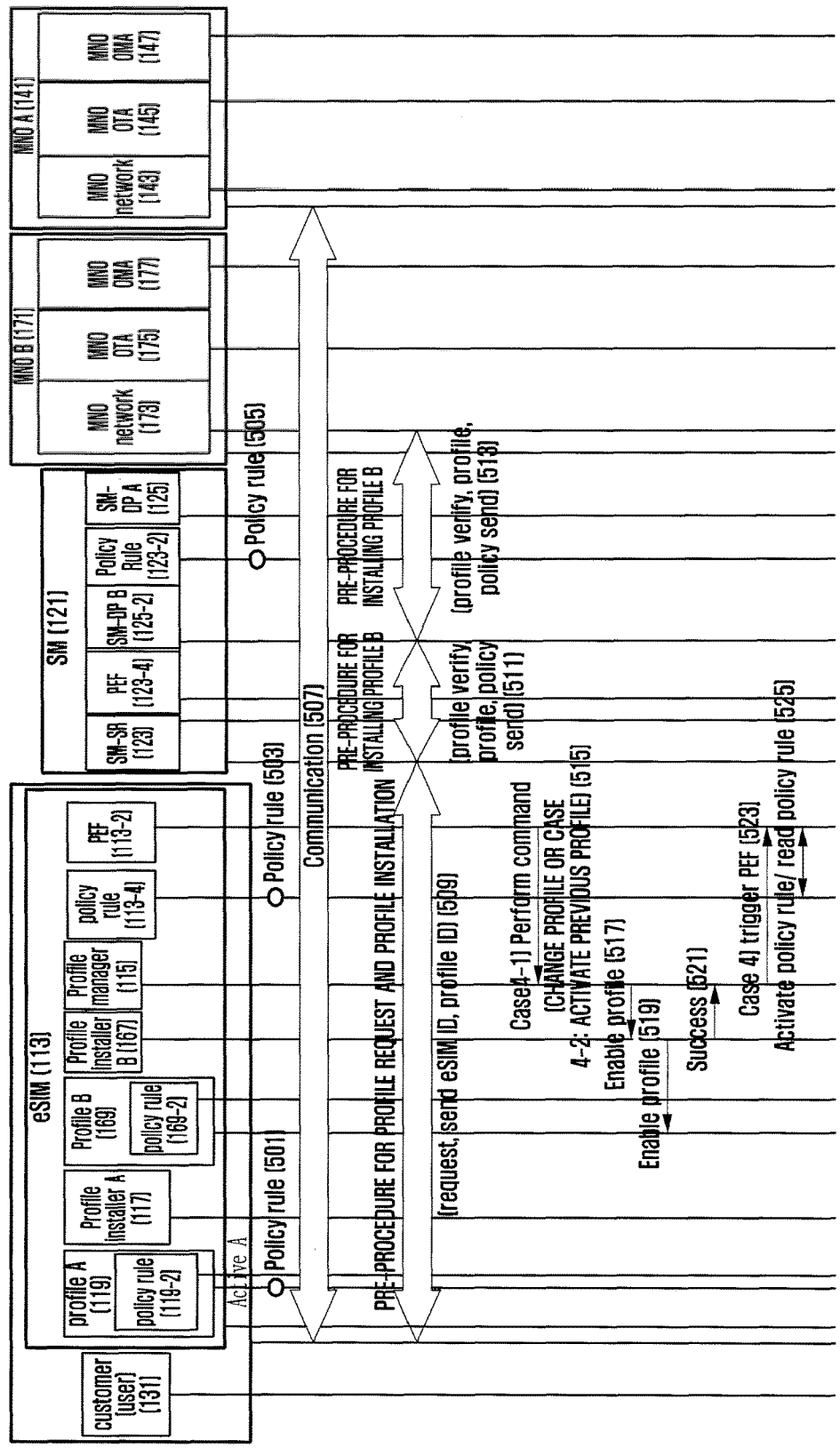
FIG. 8 is a signal flow diagram illustrating a method of adding and updating a policy in changing a profile according to the second embodiment of the present invention.
Figure 8B:
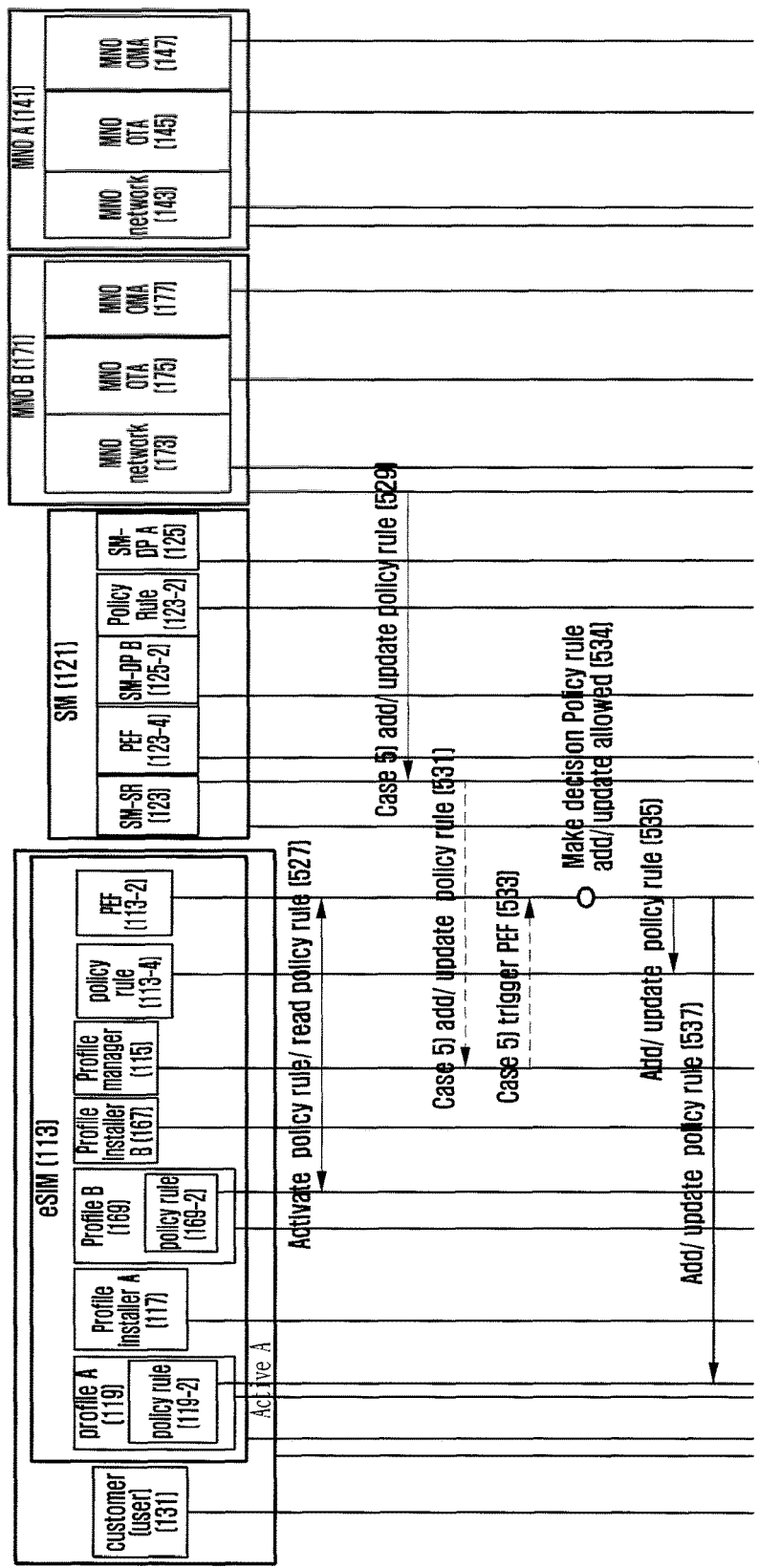

FIG. 8 is a signal flow diagram illustrating a method of adding and updating a policy in changing a profile according to the second embodiment of the present invention.

The profile A has the policy rule information related to profile A at step 801. The eSIM has the policy rule information related to the eSIM at step 803. The SM, e.g. SM-SR, has the policy rule too at step 805. At steps 801, 803, and 805, the eSIM, profile, SM, SM-SR, and SM-DP have been already configured such that the UE is capable of communicating with the operator A using the profile information stored in the eSIM; and the UE and the operator A are communicating at step 807.

The eSIM requests to the SM for the profile and installs the profile at step 809. That is, the eSIM transmits the eSIM ID to the SM and receives the profile ID.

The eSIM sends the SM the eSIM ID, profile ID, and eSIM capability. Here, the eSIM capability denotes the capability necessary for generating the profile, i.e. security credential and security information.

The SM verifies the profile ID received from the eSIM at step 811. The verification process is depicted comprehensively but includes verifying the profile to be installed and transmitting the verified profile to the SM. The profile may be transmitted from the MNO to the SM along with the policy or separately. The policy rule may include the SM policy rule to be managed by the SM, policy rules to be notified to other operators publicly, and the policy rule to be managed by the eSIM. The subscription request process comprised of steps 809, 811 and 813 may be performed in such a way that the customer uses the network or Internet access function of the device (i.e. UE) or makes a subscription request in the operator (MNO) portal.

The profile ID is transmitted by the MNO in response to the request from the subscriber. For steps 807 and 809, the eSIM and SM have to perform an authentication procedure. The authentication may be done through an authentication method with a security key of the eSIM and a public key of the SM or a certificate authority-assisted authentication method in which the certificate authority authenticates the certifications of the eSIM and SM.

The SM-SR instructs the profile manager to execute the command at step 815. For example, the SM-SR commands the profile manager to change the profile (case 4-1) or execute the legacy profile activation procedure (case 4-2). The profile change may be exemplified with the case of changing from profile A for the operator A to profile B for another operator. The legacy profile activation may be exemplified with the case where the device connected to the operator B makes a handover to the operator A and then comes back to the operator B such that the inactive profile is activated. Afterward, the profile manager makes a request to the profile installer for profile enablement at step 817. Afterward, the profile installer activates the profile at step 819 and notifies the profile manager of the successful profile activation at step 821.

The profile manager triggers the PEF to activate the policy rule at step 823. If the policy rule is hosted already as in the case 4-1 or deactivated in the case 4-2, it is necessary to activate the policy rule. The PEF activates or reads the policy rule of profile B at step 827. The PEF checks the lock expiration time to determine whether it is possible to add/update.

The MNO makes a request to the SM or SM-SR for adding/updating the policy rule at step 829. The SM-SR forwards the policy rule add/update request received from the MNO to the profile manager. The profile manager triggers the PEF to make it possible to add/update the policy rule at step 833.

The PEF determines whether it is allowed or necessary to add/update the policy rule at step 834 and adds/updates the eSIM policy rule at step 835 or the policy rule of the profile B at step 837.

Figure 9:
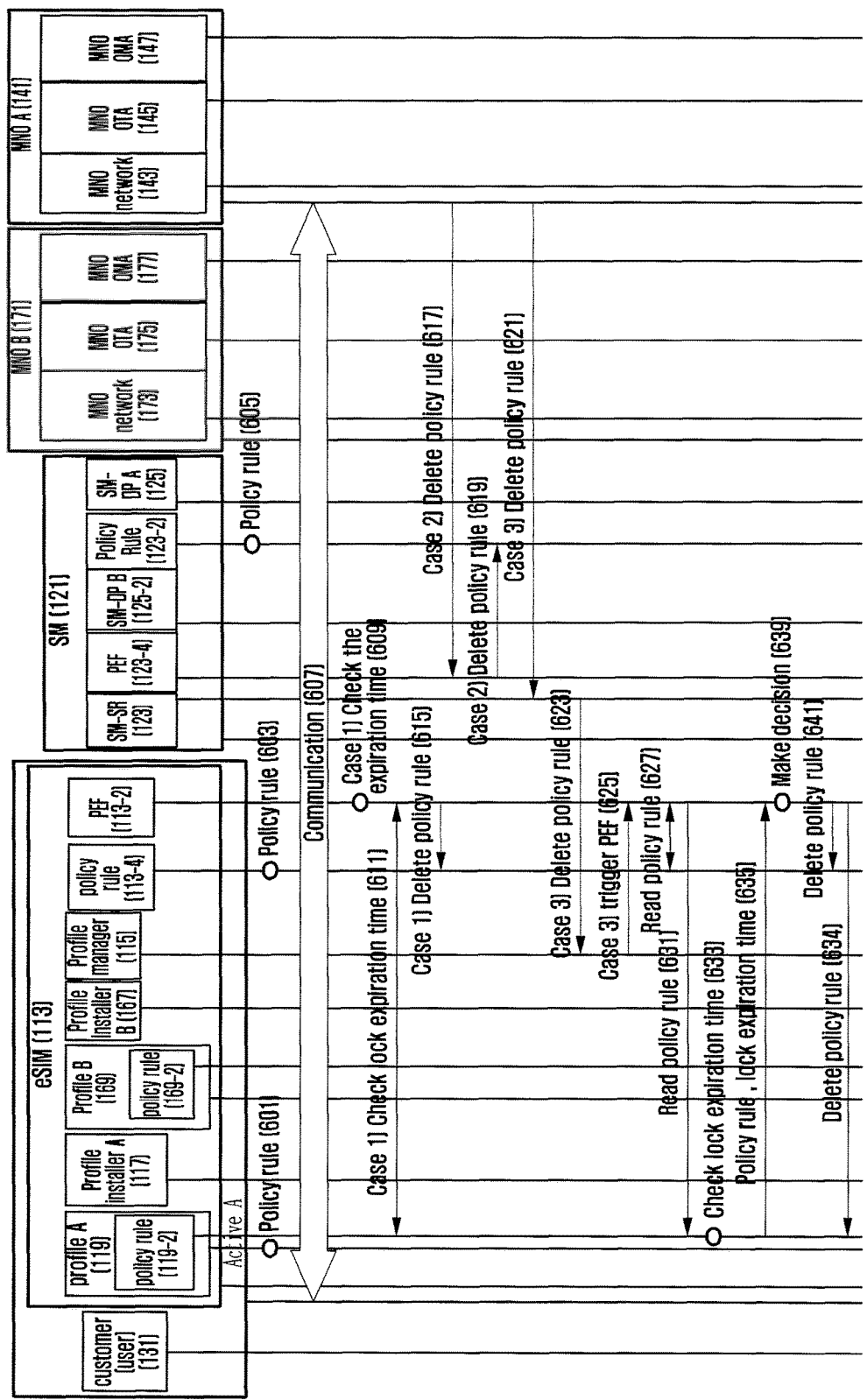
FIGS. 9A and 9B are signal flow diagrams illustrating a method of deleting and deactivating the policy in changing the profile according to the first embodiment of the present invention.

FIGS. 9A and 9B are signal flow diagrams illustrating a method of deleting and deactivating the policy in changing the profile according to the first embodiment of the present invention.

In an embodiment (case 1), the eSIM PEF checks the expiration time to determine whether it is possible to release the lock at step 909. The eSIM PEF checks the lock expiration time of the policy rule of the profile A at step 911. It the deletion lock has expired, the eSIM PEF deletes the policy rule at step 915.

In another embodiment, the MNO makes a request to the SM PEF to delete the policy rule at step 917, and the SM PEF deletes the policy rule at step 919 (case 2).

In another embodiment, the MNO makes a request to the SM or SM-SR to delete the policy rule at step 921, and the SM-SR forwards the policy rule delete request received form the MNO to the profile manager at step 923 (case 3). In the case of deleting the policy rule, although it is disabled, the policy rule may exist in the inactive state. In another embodiment, the locked policy rule, such as subsidy policy lock, may be deleted after expiration.

The profile manager triggers the PEF to delete the policy rule at step 925. The PEF reads the policy rule of the eSIM at step 927 and the policy rule of profile A at step 931. The PEF checks the lock expiration time to determine whether the policy rule is locked, i.e. whether it is possible to delete the policy rule, at step 933. Afterward, the PEF receives the policy rule and lock expiration time read from the profile A at step 935 and determines whether it is allowed to delete the policy rule at step 939. The PEF deletes the policy rule of the eSIM at step 941 and the policy of the profile A at step 943.

Figure 10A:
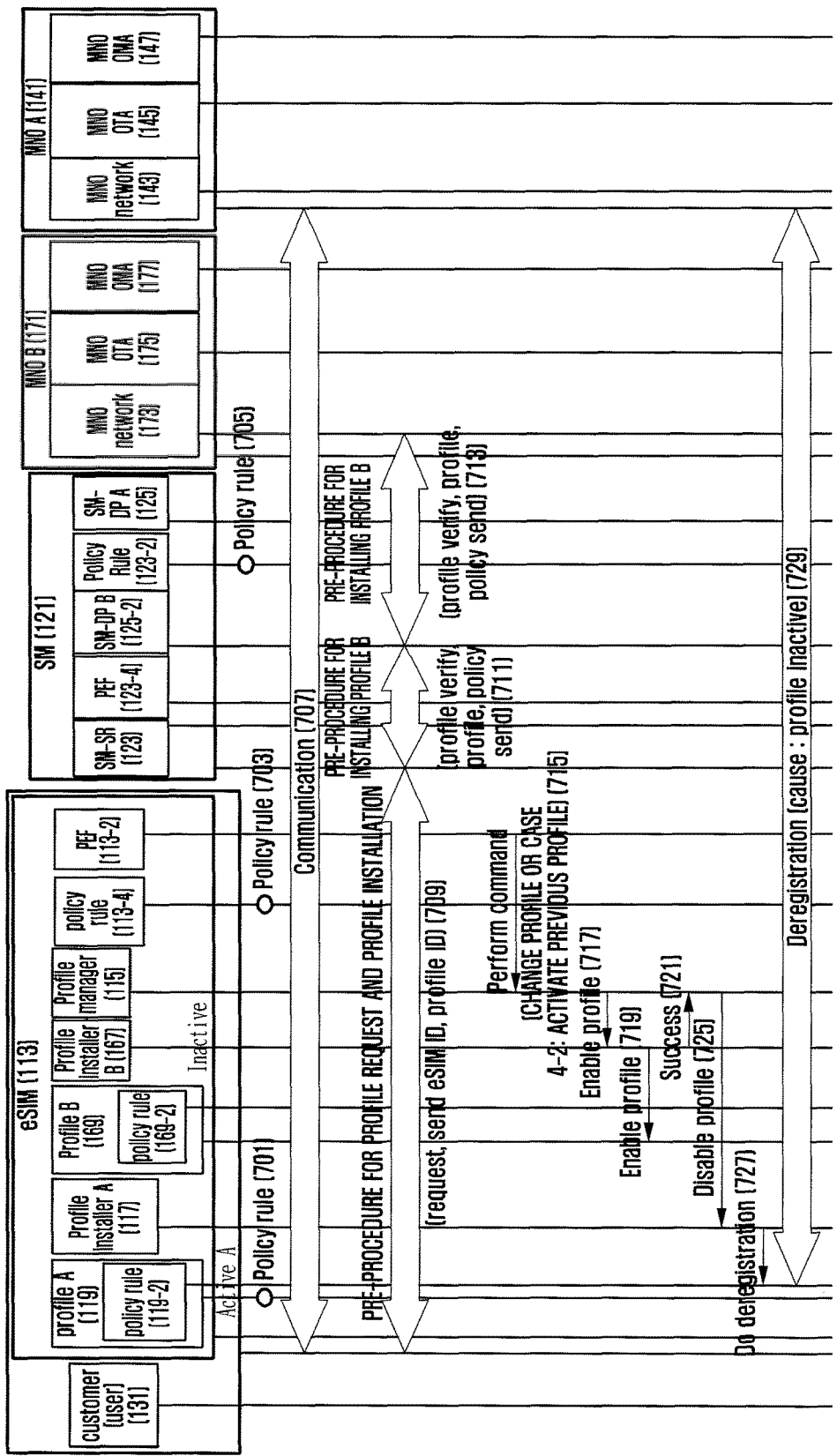
FIG. 10 is a signal flow diagram illustrating a method of deleting and deactivating the policy in changing the profile according to the second embodiment of the present invention.
Figure 10B:
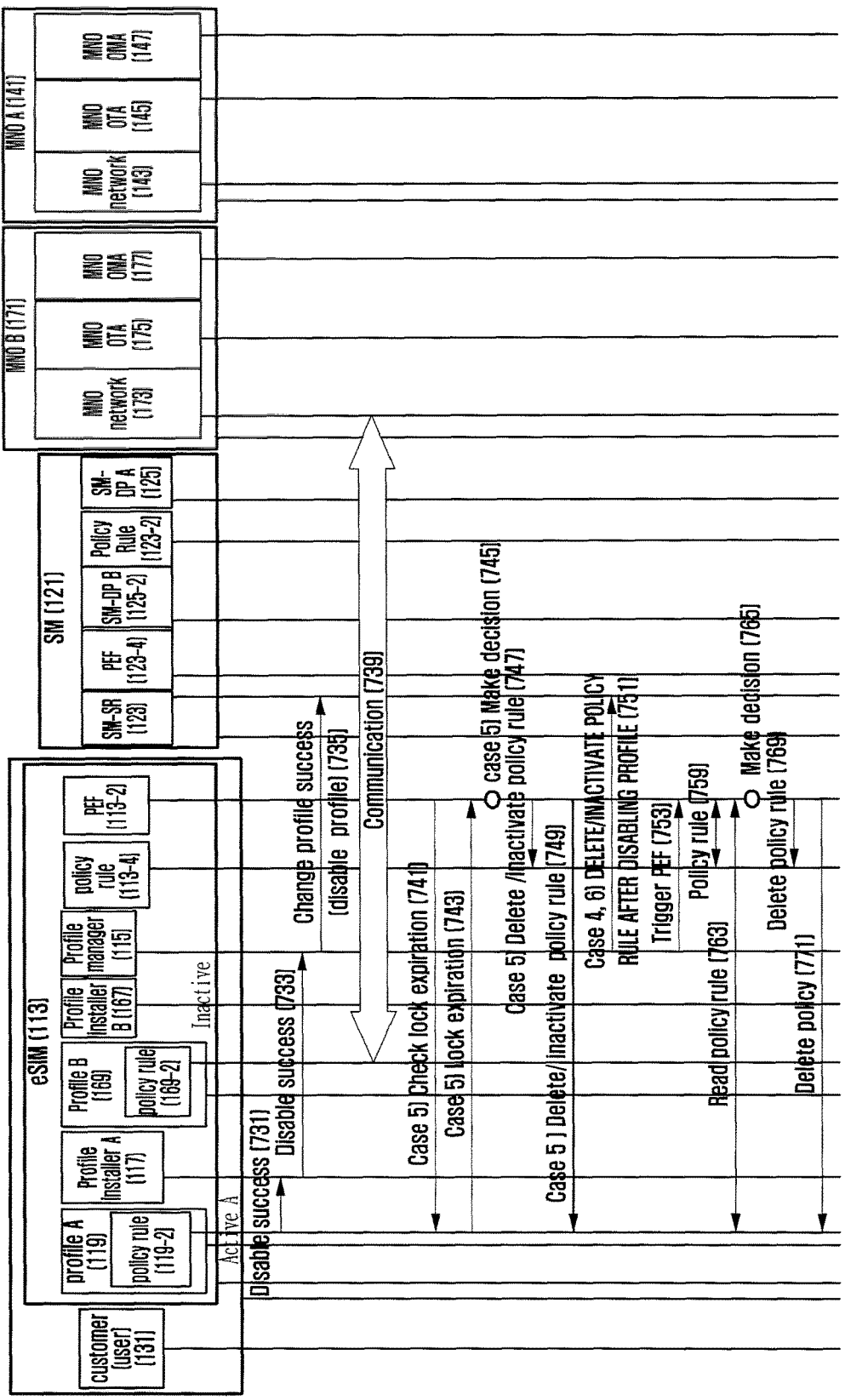

FIG. 10 is a signal flow diagram illustrating a method of deleting and deactivating the policy in changing the profile according to the second embodiment of the present invention.

The profile A has the policy rule information related to profile A at step 1001. The eSIM has the policy rule information related to the eSIM at step 1003. The SM, e.g. SM-SR, has the policy rule too at step 1005. At steps 1001, 1003, and 1005, the eSIM, profile, SM, SM-SR, and SM-DP have been already configured such that the UE is capable of communicating with the operator A using the profile information stored in the eSIM; and the UE and the operator A are communicating at step 1007.

The eSIM makes a request to the SM for the profile and performs a procedure for installing the profile at step 1009. That is, the eSIM transmits the eSIM to the SM and received the profile ID from the eSIM. The parameters transmitted from the eSIM to the SM include the eSIM ID, profile ID, and eSIM capability. Here, the eSIM capability denotes the capability necessary for generating the profile, i.e. security credential and security information.

If the profile request is received from the eSIM, the SM verifies the profile ID received from the operator or the eSIM at step 1011. Step 1009 shows only the relationship among the SM, SM-SR, and SM-DP in the verification procedure. The SM-DP verifies the profile and receives the profile from the operator to install the profile at step 1013. The profile may be transmitted from the MNO to the SM along with or in separation from the policy or separately. The profile may be transmitted from the MNO to the SM along with the policy or separately. The policy rule may be the SM policy rule to be managed by the SM, policy rule to be notified to other operators publicly, and the policy rule to be managed by the eSIM. The subscription request process comprised of steps 1009, 1011 and 1013 may be performed in such a way that the customer uses the network or Internet access function of the device (i.e. UE) and makes a subscription request by transmitting the eSIM ID in the operator (MNO) portal. The profile ID is transmitted by the MNO in response to the request from the subscriber. For steps 1009 and 1011, the eSIM and SM have to perform an authentication procedure. The authentication may be done through an authentication method with a security key of the eSIM and a public key of the SM or a certificate authority-assisted authentication method in which the certificate authority authenticates the certifications of the eSIM and SM.

Afterward, the SM-SR makes a request to the profile manager to execute a command at step 1015 (case 4). The profile manager makes a request to the profile installer to enable the profile at step 1017. The profile installer enables the profile at step 1019 and notifies the profile manager of the successful profile enablement at step 1021.

The profile manager commands the profile installer to disable the profile at step 1025. The profile installer disables the profile, i.e. deregisters the corresponding profile to the operator, at step 1027. The profile installer performs a profile deregistration procedure with the corresponding operator and sets the cause value to 'profile inactive' at step 1031. The profile installer notifies the profile manager that the profile is disabled successfully at step 1033, and the profile manager notifies the SM-SR of the successful change of profile at step 1035. Afterward, the eSIM communicates with the operator B using the profile B at step 1039.

In an embodiment, if the policy rule exists after the profile has been deleted for any reason, the policy rule may be deleted or deactivated through a process in the order of 1041→1047→1049. As at step 1041, it is checked whether the profile policy rule A is locked against deletion and, if the lock is expired, it is checked whether the policy rule can be deleted/inactivated at step 1047 and, if so, the policy rule is deleted/inactivated at step 1049 (case 5).

In another embodiment, the PEF disables the profile and then performs the policy rule inactivation (case 4)/deletion (case 6) procedure in the order of 1033→1035→(1051)→1053→1055→1059→1063→1065→1069→1071 (case 4, case 6).

If the SM-SR recognizes the change from profile A to profile B or deactivation of profile B at step 1035, it may command the profile manager to inactivate or delete the policy rule at step 1051. In an embodiment, step 1051 may be omitted. That is, the profile manager recognizes that the policy rule should be inactivated or deleted at step 1033 but, if step 1053 is performed, step 1051 may be omitted. At step 1053, the profile manager triggers the PEF to inactivate/delete the profile policy rule. The PEF reads the eSIM profile rule at step 1059. Afterward, the PEF reads the policy rule of profile A at step 1063. When reading the policy rule, the PEF checks the lock expiration time to determine whether the policy rule is locked against inactivation/deletion. The PEF also checks whether it is possible to inactivate or delete the policy rule.

The PEF determines whether it is allowed or necessary to inactivate/delete the policy rule at step 1065 and inactivates/deletes the eSIM policy rule at step 1069 or inactivates/deletes the policy rule of profile A at step 1071 depending on the determination result.

Although the description has been made with reference to particular embodiments, the present invention can be implemented with various modifications without departing from the scope of the present invention. Thus, the present invention is not limited to the particular embodiments disclosed but will include the following claims and their equivalents.

What is claimed is:

1. A method by a server communicating with a terminal, the method comprising:
    receiving a request, including a profile expiration time of the profile for a first network, for use of a second network operated by a second operator from a terminal that performs data communication on the first network operated by a first operator;
    determining whether to use the second network operated by the second operator based on the profile expiration time of the profile for the first network;
    transmitting, when use of the second network is determined, to the terminal, a profile of the second network for using the second network; and
    transmitting, when an event associated with the profile of the second network occurs, to the terminal, an indicator including a policy rule of the profile for the second network, for determining whether the event is executable based on the policy rule of the profile for the second network and a policy rule of the profile for the terminal.

2. The method of claim 1, wherein the request includes at least one of an embedded subscriber identity module (eSIM) identifier of the terminal, an eSIM capability, an operator change indicator, or a profile identifier of the first network.

3. The method of claim 1, further comprising performing mutual authentication with the terminal, wherein the mutual authentication is performed using (1) a public key and a security key stored in the terminal and server or (2) a certification issued by a certificate authority.

4. The method of claim 1, wherein transmitting, to the terminal, the profile of the second network comprises:
encrypting the profile of the second network; and
transmitting the encrypted profile of the second network to the terminal.

5. The method of claim 1, further comprising transmitting, when an event related to the profile of the second network occurs, an event indicator to the terminal.

6. The method of claim 5, wherein the event includes a request for executing at least one of an addition, a modification, a deletion, an update, an activation, and a deactivation of the profile of the second network.

7. A method by a terminal communicating with a server, the method comprising:
transmitting a request, including a profile expiration time of the profile for a first network, for use of a second network operated by a second operator in a state of communicating on the first network operated by a first operator;
receiving, when use of the second network is determined based on the profile expiration time of the profile for the first network by the server, from the server, a profile of the second network for using the second network;
installing the profile of the second network received from the server on an embedded subscriber identity module (eSIM);
performing data communication on the second network using the profile of the second network that is installed on the eSIM;
receiving, when an event associated with the profile of the second network occurs, from the server, an indicator including a policy rule of the profile for the second network; and
determining whether the event is executable based on the policy rule of the profile for the second network and a policy rule of the profile for the terminal.

8. The method of claim 7, wherein the request comprises at least one of an eSIM identifier of the terminal, an eSIM capability, an operator change indicator, or a profile identifier of the first network.

9. The method of claim 7, wherein installing the profile of the second network comprises:
decrypting, when the profile of the second network is encrypted, the encrypted profile of the second network; and
installing the decrypted profile of the second network on the eSIM.

10. The method of claim 7, further comprising:
determining, when an indicator indicating an event related to the profile of the second network is received, whether the event is executable based on a policy included in the profile; and
applying the event to the profile of the second network that is installed in the eSIM depending on a result of the determination.

11. The method of claim 10, wherein the event includes a request for executing at least one of an addition, a modification, a deletion, an update, an activation, and a deactivation of the profile of the second network.

12. A server communicating with a terminal, the server comprising:
a transceiver configured to perform a data communication with the terminal and operators; and
a controller configured to:
control the transceiver to receive a request, including a profile expiration time of the profile for a first network, for use of a second network operated by a second operator from a terminal that performs data communication on the first network operated by a first operator,
determine whether to use the second network operated by the second operator based on the profile expiration time of the profile for the first network,
control the transceiver to transmit, when use of the second network is determined, to the terminal, a profile of the second network for using the second network, and
control the transceiver to transmit, when an event associated with the profile of the second network occurs, to the terminal, an indicator including a policy rule of the profile for the second network, for determining whether the event is executable based on the policy rule of the profile for the second network and a policy rule of the profile for the terminal.

13. The server of claim 12, wherein the request includes at least one of an embedded subscriber identity module (eSIM) identifier of the terminal, an eSIM capability, an operator change indicator, or a profile identifier of the first network.

14. The server of claim 12, wherein the controller is configured to encrypt the profile of the second network and control the transceiver to transmit the encrypted profile of the second network to the terminal.

15. The server of claim 12, wherein the controller is configured to control the transceiver to transmit, when an event related to the profile of the second network occurs, an event indicator to the terminal.

16. The server of claim 15, wherein the event includes a request for executing at least one of an addition, a modification, a deletion, an update, an activation, or a deactivation of the profile of the second network.

17. A terminal communicating with a server, the terminal comprising:
an embedded subscriber identity module (eSIM) configured to apply and manage a profile of a network operated by an operator;
a transceiver configured to communicate data with the server or the operator; and
a controller configured to:
control the transceiver to transmit a request, including a profile expiration time of the profile for a first network, for use of a second network operated by a second operator in a state of communicating on the first network operated by a first operator,
control the transceiver to receive, when use of the second network is determined based on the profile expiration time of the profile for the first network by the server, from the server, a profile of the second network for using the second network,
install the profile of the second network received from the server on the eSIM,
control the transceiver to perform data communication on the second network using the profile of the second network that is installed on the eSIM, control the transceiver to receive, when an event associated with the profile of the second network occurs, from the server, an indicator including a policy rule of the profile for the second network, and determine whether the event is executable based on the policy rule of the profile for the second network and a policy rule of the profile for the terminal.

18. The terminal of claim 17, wherein the controller is configured to decrypt, when the profile of the second network is encrypted, the encrypted profile of the second network, and install the decrypted profile of the second network on the eSIM.

19. The terminal of claim 17, wherein the controller is configured to determine, when an indicator indicating an event related to the profile of the second network is received, whether the event is executable based on a policy included in the profile, and apply the event to the profile of the second network that is installed in the eSIM depending on a result of the determination.

20. The terminal of claim 19, wherein the event includes a request for executing at least one of an addition, a modification, a deletion, an update, an activation, or a deactivation of the profile of the second network.

* * * * *